United States Patent
Liu et al.

(10) Patent No.: US 11,861,149 B2
(45) Date of Patent: Jan. 2, 2024

(54) INTERFACE INFORMATION PROCESSING METHOD AND APPARATUS, STORAGE MEDIUM, AND DEVICE

(71) Applicant: TENCENT TECHNOLOGY (SHENZHEN) COMPANY LIMITED, Guangdong (CN)

(72) Inventors: Yan Liu, Shenzhen (CN); Ziqian Wang, Shenzhen (CN); Zuofeng Sun, Shenzhen (CN); Huihuang Huang, Shenzhen (CN); Wentao Zhong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/296,074

(22) Filed: Apr. 5, 2023

(65) Prior Publication Data
US 2023/0259256 A1 Aug. 17, 2023

Related U.S. Application Data

(63) Continuation of application No. PCT/CN2022/095194, filed on May 26, 2022.

(30) Foreign Application Priority Data

Jun. 30, 2021 (CN) .......................... 202110745185.9

(51) Int. Cl.
*G06F 3/0484* (2022.01)
*G06F 40/58* (2020.01)
(Continued)

(52) U.S. Cl.
CPC ............ *G06F 3/0484* (2013.01); *G06F 40/58* (2020.01); *G06T 11/001* (2013.01); *G06T 13/80* (2013.01);
(Continued)

(58) Field of Classification Search
CPC .................................................... G06F 3/0484
(Continued)

(56) References Cited

U.S. PATENT DOCUMENTS 8,812,482 B1 * 8/2014 Kapoor ................. G06F 16/273
707/706
2019/0308104 A1 * 10/2019 Nicolades ............... A63F 13/35
(Continued)

FOREIGN PATENT DOCUMENTS

| CN | 107943796 A | 4/2018 |
| CN | 111553172 A | 8/2020 |

(Continued)

OTHER PUBLICATIONS

International Search Report for PCT/CN2022/095194 dated Aug. 4, 2022 (PCT/ISA/210).
(Continued)

*Primary Examiner* — Ruay Ho
(74) *Attorney, Agent, or Firm* — Sughrue Mion, PLLC

(57) ABSTRACT

An interface information processing method and apparatus, a storage medium, and a device are provided. The method includes: displaying, based on a trigger operation on a floating translation component in a first display interface, a trigger progress in the floating translation component, the first display interface including a character of a first language type, the trigger progress being associated with trigger duration, and the trigger duration being a duration of the trigger operation on the floating translation component; and switching the first display interface to a second display interface based on the trigger progress in the floating translation component satisfying a full-screen translation start progress, the second display interface including a character
(Continued)

of a second language type, and the character of the second language type being obtained by translating the character of the first language type.

19 Claims, 11 Drawing Sheets

(51) Int. Cl.
| | | |
|---|---|---|
| *G06V 30/14* | (2022.01) | |
| *G06V 30/19* | (2022.01) | |
| *G06V 10/56* | (2022.01) | |
| *G06T 11/00* | (2006.01) | |
| *G06T 13/80* | (2011.01) | |

(52) U.S. Cl.
CPC .......... *G06V 10/56* (2022.01); *G06V 30/1444* (2022.01); *G06V 30/19* (2022.01); *G06T 2200/24* (2013.01); *G06V 2201/02* (2022.01)

(58) Field of Classification Search
USPC .................................. 715/703, 747; 707/706
See application file for complete search history.

(56) References Cited

U.S. PATENT DOCUMENTS

| | | | |
|---|---|---|---|
| 2021/0165855 A1 | 6/2021 | Stuehler et al. | |
| 2022/0350974 A1* | 11/2022 | Etwaru | G06V 30/147 |
| 2023/0006952 A1* | 1/2023 | Li | H04L 51/224 |
| 2023/0117213 A1* | 4/2023 | Chen | G06F 9/451 |
| | | | 715/747 |

FOREIGN PATENT DOCUMENTS

| | | |
|---|---|---|
| CN | 111680521 A | 9/2020 |
| CN | 107943796 B | 3/2022 |

OTHER PUBLICATIONS

Written Opinion for PCT/CN2022/095194 dated Aug. 4, 2022 (PCT/ISA/237).

* cited by examiner

INTERFACE INFORMATION PROCESSING METHOD AND APPARATUS, STORAGE MEDIUM, AND DEVICE

CROSS-REFERENCE RELATED APPLICATION(S)

This application is a continuation application of International Application No. PCT/CN2022/095194 filed May 26, 2022, which claims priority to Chinese Patent Application No. 202110745185.9, filed with the China National Intellectual Property Administration on Jun. 30, 2021, the disclosures of which are incorporated herein by reference in their entireties.

FIELD

The disclosure relates to the field of information processing technologies, and in particular, to an interface information processing method and apparatus, a storage medium, and a device.

BACKGROUND

With rapid development of Internet technologies, work and life rely more and more on Internet information platforms. Due to the existence of multiple nationalities and multiple languages in the world, users may encounter language barriers when browsing interfaces.

SUMMARY

Some embodiments provide an interface information processing method, including:

displaying, based on a trigger operation on a floating translation component in a first display interface, a trigger progress in the floating translation component, the first display interface including a character of a first language type, the trigger progress being associated with trigger duration, and the trigger duration being a duration of the trigger operation on the floating translation component; and switching the first display interface to a second display interface based on the trigger progress in the floating translation component satisfying a full-screen translation start progress, the second display interface including a character of a second language type, and the character of the second language type being obtained by translating the character of the first language type.

Some embodiments provide an interface information processing apparatus, including:

at least one memory configured to store program code; and at least one processor configured to read the program code and operate as instructed by the program code, the program code including:

trigger progress display code configured to cause the at least one processor to display, based on a trigger operation on a floating translation component in a first display interface, a trigger progress in the floating translation component, the first display interface including a character of a first language type, the trigger progress being associated with trigger duration, and the trigger duration being a duration of the trigger operation on the floating translation component; and interface switching code configured to cause the at least one processor to switch the first display interface to a second display interface based on the trigger progress in the floating translation component satisfying a full-screen translation start progress, the second display interface including a character of a second language type, and the character of the second language type being obtained by translating the character of the first language type.

Some embodiments provide a computer device, including a processor and a memory.

The processor is connected to the memory. The memory is configured to store a computer program. When the computer program is executed by the processor, the computer device is enabled to perform the method provided in some embodiments.

Some embodiments provide a non-transitory computer-readable storage medium storing computer code that when executed by at least one processor causes the at least one processor to perform the method provided in some embodiments.

Some embodiments provides a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform the method provided in some embodiments.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

At present, a user who browses an interface containing a character unreadable for the user needs to open translation software, and manually enter the character unreadable for the user into the translation software for translation. For an interface containing a large quantity of unreadable characters, efficiency of translating the characters in the interface is low.

Some embodiments provide an interface information processing method and apparatus, a storage medium, and a device. Efficiency of translating a character in a display interface can be improved.

Figure 1:
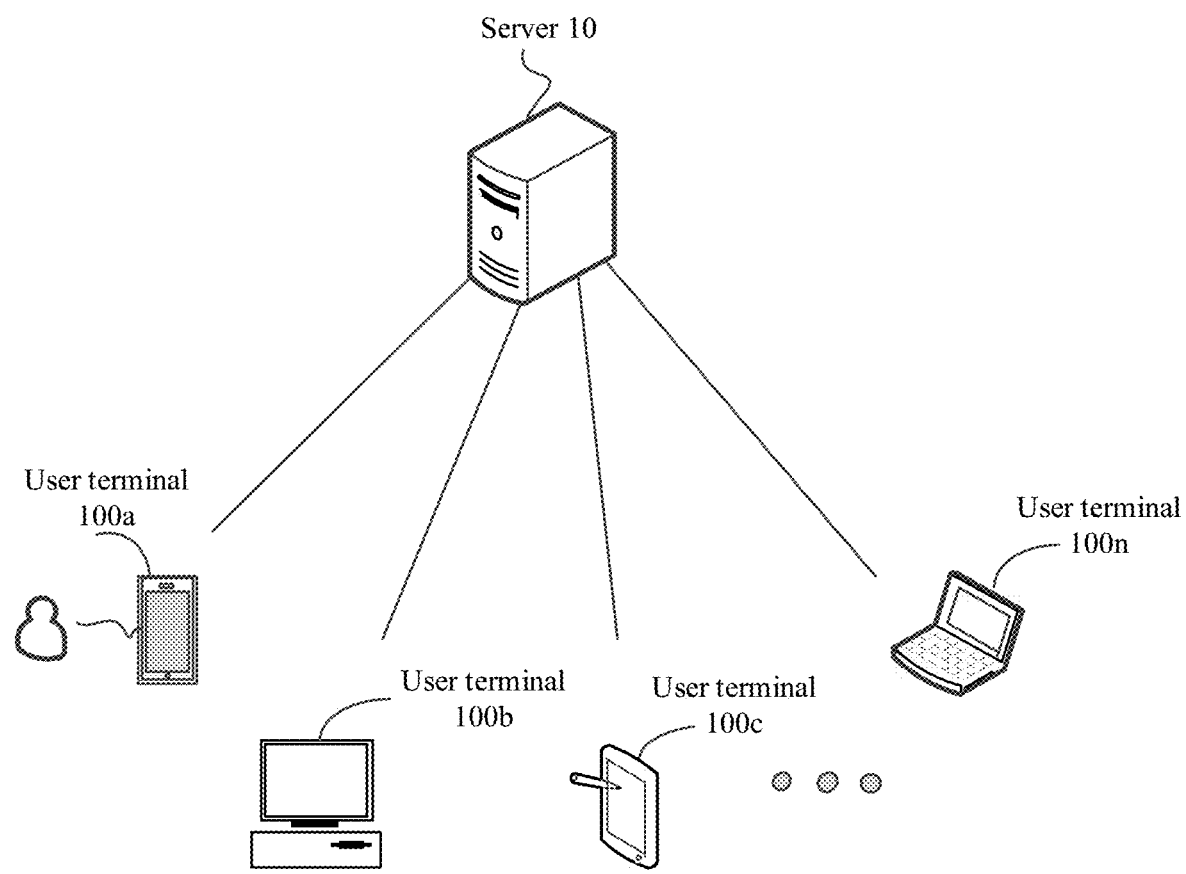
FIG. 1 is a schematic architectural diagram of an interface information processing system according to some embodiments.

FIG. 1 is a schematic structural diagram of an interface information processing system applicable to an interface information processing method according to some embodiments. As shown in FIG. 1, the interface information processing system may include a server 10 and a user terminal cluster. The user terminal cluster may include one or more user terminals. The quantity of the user terminals is not limited herein. As shown in FIG. 1, the user terminal cluster may include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n each may establish a network connection to the server 10, such that each user terminal may perform data interaction with the server 10 through the network connection.

Each user terminal in the user terminal cluster may include an intelligent terminal with an interface information processing function, for example, a smartphone, a tablet computer, a notebook computer, a desktop computer, a wearable device, a smart home, a head-mounted device, or an in-vehicle terminal. It is to be understood that a target application (that is, an application client) may be installed in each user terminal in the user terminal cluster shown in FIG. 1, and when run in each user terminal, the application client may perform data interaction with the server 10 shown in FIG. 1.

As shown in FIG. 1, the server 10 may be an independent physical server, or may be a server cluster or distributed system including a plurality of physical servers, or may be a cloud server providing basic cloud computing service such as cloud service, a cloud database, cloud computing, a cloud function, cloud storage, network service, cloud communication, middleware service, domain name service, security service, a content delivery network (CDN), or a big data and artificial intelligence platform.

For ease of understanding, in some embodiments, one of the plurality of user terminals shown in FIG. 1 may be selected as a target user terminal. The target user terminal may include an intelligent terminal with the interface information processing function, for example, a smartphone, a tablet computer, a notebook computer, a desktop computer, or a smart television. For example, for ease of understanding, in some embodiments, the user terminal 100a shown in FIG. 1 may be determined as the target user terminal. After a user enables a floating permission of a floating translation component for displaying in a first display interface, the floating translation component may be displayed on the first display interface. The first display interface may be a display interface including a character of a first language type in the user terminal 100a. The character of the first language type may be a non-native character for the user, for example, English, Japanese, or Korean, that is, a character except a native character for the user. When the user performs a trigger operation on the floating translation component in the first display interface, a trigger progress is displayed in the floating translation component. The trigger progress is associated with trigger duration. The trigger duration is duration of the trigger operation performed by the user on the floating translation component, for example, duration of a tap operation performed by the user on the floating translation component. When the user terminal 100a detects that the trigger progress in the floating translation component satisfies a full-screen translation start progress, the first display interface may be sent to the server 10. After receiving the first display interface sent by the user terminal 100a, the server 10 may translate the character of the first language type in the first display interface to obtain a character of a second language type, and generate a second display interface according to the character of the second language type. The character of the second language type may be a native character for the user. The user terminal 100a may obtain a language type displayed in the user terminal 100a by default as the second language type. The user terminal 100a sends the first display interface and the second language type to the server 10, such that the server 10 translates the character of the first language type in the first display interface into the character of the second language type. After receiving the second display interface sent by the server, the user terminal 100a may switch the first display interface to the second display interface. In this way, the character in the display interface can be translated quickly, and efficiency of translating the character in the display interface can be improved.

In some embodiments, the floating translation component may be a component that floats over the display interface of the application client and that is configured to translate the character on the display interface.

Figure 2:
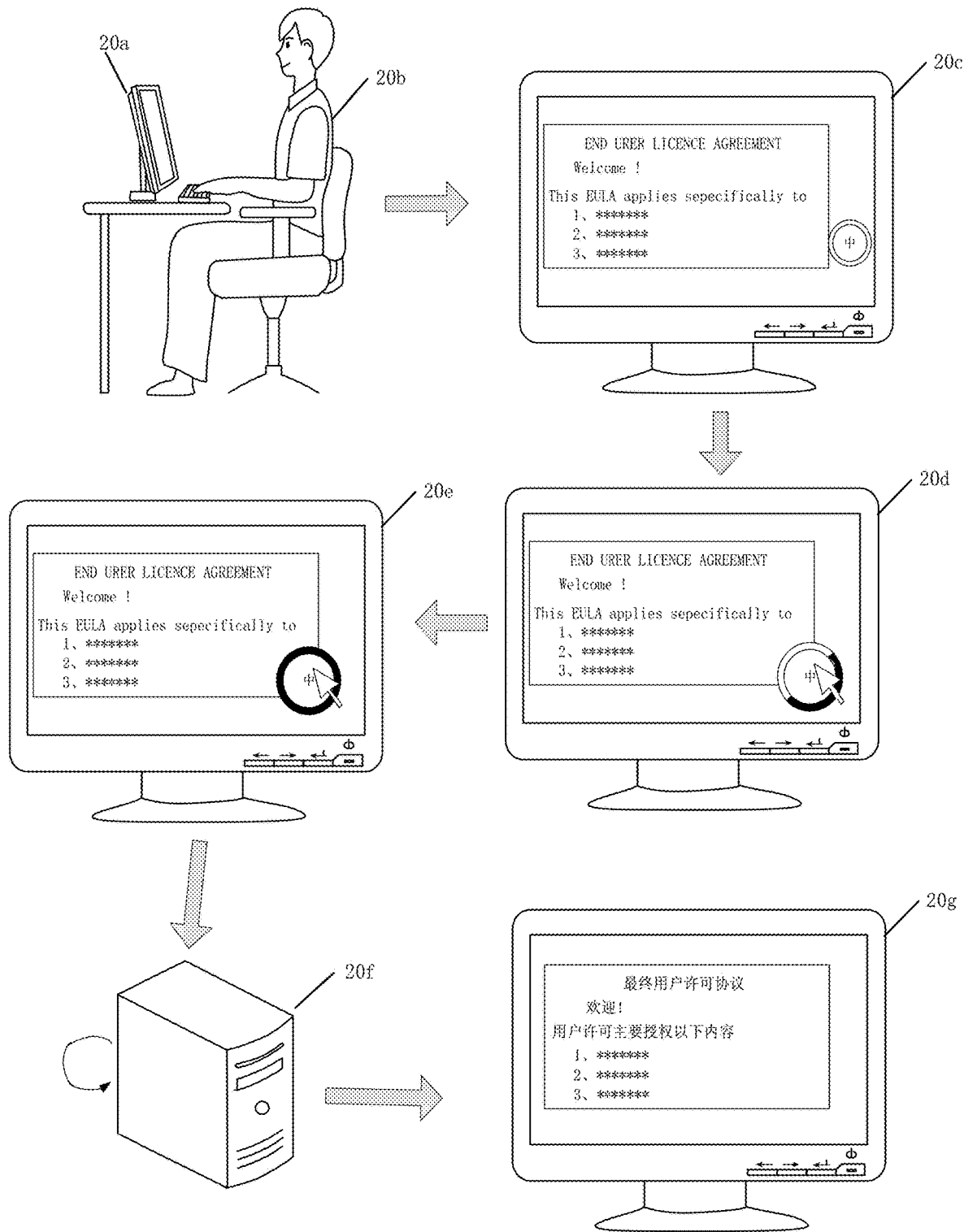
FIG. 2 is a schematic diagram of an application scenario of interface information processing according to some embodiments.

FIG. 2 is a schematic diagram of an application scenario of interface information processing according to some embodiments. As shown in FIG. 2, the first display interface may be a display interface including a character of an English character type. When a target user 20b browses an interface in a user terminal, if the target user 20b determines that a first display interface 20c displayed on the user terminal 20a needs to be translated, the target user 20b may perform a trigger operation on a floating translation component in the first display interface 20c. That is, the target user 20b may perform a tap operation on the first display interface 20c. After receiving the tap operation of the target user 20_b_, the user terminal 20_a_ may obtain trigger duration of the tap operation performed by the target user 20_b_ on the floating translation component. The trigger duration is a duration of the trigger operation performed by the target user 20_b_ on the floating translation component. A trigger progress is displayed in the floating translation component according to the trigger duration. The trigger progress in the floating translation component is displayed in a display interface 20_d_. The user terminal 20_a_ may detect the trigger progress in the floating translation component in real time. When the user terminal 20_a_ detects that the trigger progress in the floating translation component satisfies a full-screen translation start progress, that is, when the trigger progress in the floating translation component is displayed to be 100% in the display interface 20_e_ of the user terminal 20_a_, the currently displayed first display interface is sent to a server 20_f_. After receiving the first display interface sent by the user terminal 20_a_, the server 20_f_ may translate an English character in the first display interface to generate a second display interface. When translating the English character in the first display interface, the server 20_f_ may directly perform default translation on the first display interface to translate the English character in the first display interface into a default character, for example, translate the English character in the first display interface into a Chinese character so as to obtain the Chinese character corresponding to the English character in the first display interface, and generate, according to the Chinese character, the second display interface including a character of the second language type. Certainly, the server 20_f_ may also translate the English character in the first display interface into a native character for the target user 20_b_, and generate a second display interface including a character of the second language type. After generating the second display interface including the character of the second language type, the server 10 may send the second display interface to the user terminal 20_a_. The user terminal 20_a_ displays the second display interface, that is, may output a display interface 20_g_ including the second display interface, such that the target user 20_b_ browses the first display interface including the English character. In this way, full-screen translation may be performed on the first display interface including the English character, which can improve the efficiency of translating the character in the display interface.

Figure 3:
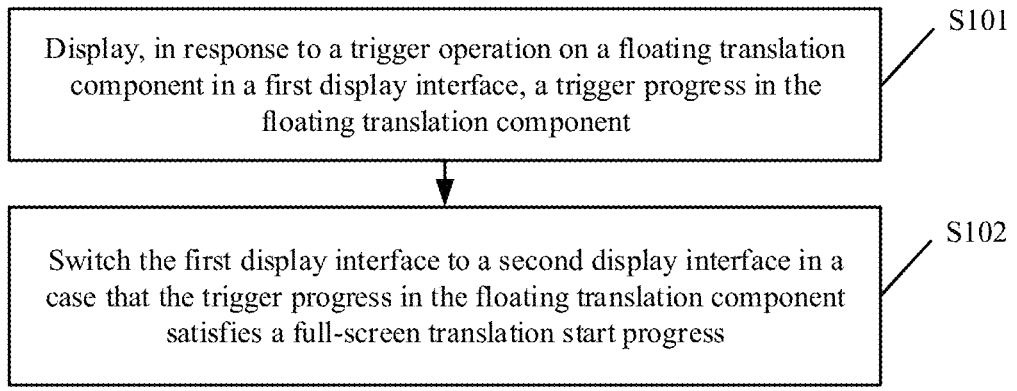
FIG. 3 is a schematic flowchart of an interface information processing method according to some embodiments.

FIG. 3 is a schematic flowchart of an interface information processing method according to some embodiments. The interface information processing method may be performed by a computer device. The computer device may be a server (for example, the server 10 in FIG. 1), or a user terminal (for example, any user terminal in the user terminal cluster in FIG. 1), or a system including a server and a user terminal. This is not limited in this application. As shown in FIG. 3, the interface information processing method may include operations S101 to S102.

S101: Display, in response to a trigger operation on a floating translation component in a first display interface, a trigger progress in the floating translation component.

In some embodiments, if there is a language barrier to a character in a display interface displayed in the computer device when a target user browses an interface, the trigger operation may be performed on the floating translation component on the display interface in the computer device. The computer device may translate the character in the display interface, and output a display interface corresponding to a character obtained through translation, such that the target user browses the display interface without language barriers. In some embodiments, when the target user performs the trigger operation on the floating translation component in the first display interface, a trigger progress is displayed in the floating translation component. The trigger progress is associated with trigger duration. The first display interface includes a character of a first language type unreadable for the target user. For example, when the native language of the target user is Chinese, and there is a language barrier to another language such as English, Japanese, or Korean, if the target user browses the first display interface including an English character, the trigger operation may be performed on the floating translation component in the first display interface, and the computer device may display the trigger progress in the floating translation component in response to the trigger operation of the target user. The floating translation component may float on a screen of the computer device, that is, is displayed in the display interface of the computer device. The target user may adjust a display position of the floating translation component to adjust the position of the floating translation component to a proper position, so as to avoid browsing of the display interface by the target user. When the target user performs the trigger operation on the floating translation component, a shape of the floating translation component may be enlarged, and the trigger progress may be displayed in the floating translation component. In this way, the target user easily notices that the floating translation component is being started.

When the computer device displays the trigger progress in the floating translation component in response to the trigger operation on the floating translation component, the computer device may obtain the trigger duration of the trigger operation performed by the target user on the floating translation component, that is, duration of the trigger operation performed by the target user on the floating translation component, and determine the trigger progress according to the trigger duration. For example, when the trigger progress is 100%, trigger duration of 4 seconds is needed. When the trigger duration is 1 second, the trigger progress is displayed to be 25% in the floating translation component. When the trigger duration is 3 seconds, the trigger progress is displayed to be 75% in the floating translation component. Displaying the trigger progress in the floating translation component can prompt the target user that the floating translation component is being started for full-screen translation. If the target user intends to start the floating translation component for full-screen translation, the trigger operation on the floating translation component may be continued; or if the target user does not intend to start the floating translation component for full-screen translation, the trigger operation on the floating translation component is stopped. In this way, the floating translation component may be started for full-screen translation of the display interface only when the target user determines that the floating translation component needs to be started and the trigger duration for the floating translation component reaches target duration. Therefore, the floating translation component can be prevented from being started by a mistaken touch when the user does not need full-screen translation of the display interface to cause a waste of browsing time of the target user and further affect experience of the target user.

In some embodiments, the trigger operation performed by the target user on the floating translation component in the first display interface may be a tap operation. When intending to start the floating translation component, the target user may keep tapping the floating translation component. The computer device may display the trigger progress in the floating translation component, that is, display a tap progress, in response to the tap operation performed by the target user on the floating translation component, so as to prompt the target user that the floating translation component is currently being started for full-screen translation. When the trigger progress in the floating translation component does not reach a full-screen translation start progress, if the target user does not intend to start the floating translation component for full-screen translation, the tap operation on the floating translation component may be stopped, and the computer device may not start the floating translation component for full-screen translation; or if the target user intends to start the floating translation component, the tap operation on the floating translation component may be continued to reach a full-screen translation start progress. The full-screen translation start progress is a start determining condition of the floating translation component. That is, the floating translation component may be started for full-screen translation only when the trigger progress in the floating translation component satisfies the full-screen translation start progress.

In some embodiments, the trigger operation performed by the target user on the floating translation component in the first display interface may be a voice wake-up operation. When intending to start the floating translation component, the target user may speak a target statement to wake up the floating translation component. The computer device may display the trigger progress in the floating translation component, that is, display a voice wake-up progress, in response to the voice wake-up operation performed by the target user on the floating translation component, so as to prompt the target user that the floating translation component is currently being started for full-screen translation. When the trigger progress in the floating translation component does not reach a full-screen translation start progress, if the target user does not intend to start the floating translation component for full-screen translation, the floating translation component may be tapped to cancel start of the floating translation component for full-screen translation, and the computer device may not start the floating translation component for full-screen translation; or if the target user intends to start the floating translation component, the floating translation component may be started for full-screen translation when the trigger progress of the floating translation component reaches a full-screen translation start progress.

In some embodiments, the computer device may further obtain a configured permission corresponding to the floating translation component, and detect a floating permission of the floating translation component according to the configured permission to obtain a floating permission detection result. If the floating permission detection result indicates that the floating translation component has the floating permission, the floating translation component is displayed in the first display interface. The floating translation component may be always displayed in the display interface browsed by the target user, such that the target user may start the floating translation component for full-screen translation of the display interface when encountering a language barrier. This effectively solves a problem of language barrier occurring when the target user browses the display interface, and can improve interface browsing experience of the user.

In some embodiments, when displaying the floating translation component in the first display interface, the computer device may obtain the configured permission of the floating translation component, and detect the floating permission of the floating translation component according to the configured permission to obtain the floating permission detection result of the floating translation component. The configured permission of the floating translation component may be configured when the target user enables a translation service of the floating translation component for the first time. That is, when the target user enables the translation service of the floating translation component for the first time, running of the floating translation component needs authorization of the target user, and the target user may configure a relevant permission of the floating translation component according to information that is indicated by the floating translation component and that is about enabling the relevant permission, to obtain the configured permission of the floating translation component. If the computer device detects that the floating permission detection result indicates that the floating translation component has the floating permission, the floating translation component is displayed in the first display interface.

In some embodiments, if the computer device detects that the floating permission detection result indicates that the floating translation component does not have the floating permission, a permission editing window for the floating translation component is output. The floating translation component is displayed in the first display interface in response to an enabling operation on a first floating authorization control in the permission editing window.

In some embodiments, when the computer device detects that the floating permission detection result of the floating translation component indicates that the floating translation component does not have the floating permission, the permission editing window for the floating translation component is output. The permission editing window includes the first floating authorization control for enabling the floating permission of the floating translation component. The target user may tap the first floating authorization control in the permission editing window to enable the floating permission of the floating translation component. The computer device may display the floating translation component in the first display interface in response to the enabling operation performed by the target user on the first floating authorization control. If the target user does not perform the enabling operation on the first floating authorization control, prompt information is output, so as to prompt the target user that a full-screen translation service provided by the floating translation component is available only when the floating permission of the floating translation component is enabled.

In some embodiments, the target user may set a target display interface for displaying the floating translation component in the computer device. After obtaining a setting instruction of the target user for the target display interface, the computer device may display the floating translation component on only the target display interface in response to the setting instruction of the target user. The target display interface may be a display interface including another language type except the native language of the target user, and is specified by the target user. Alternatively, the computer device may directly obtain a default character type currently displayed to the target user, and determine, according to the default character type, the target display interface in which the floating translation component may be displayed, that is, determine a display interface including a character type except the default character type as the target display interface in which the floating translation component may be displayed.

Figure 4:
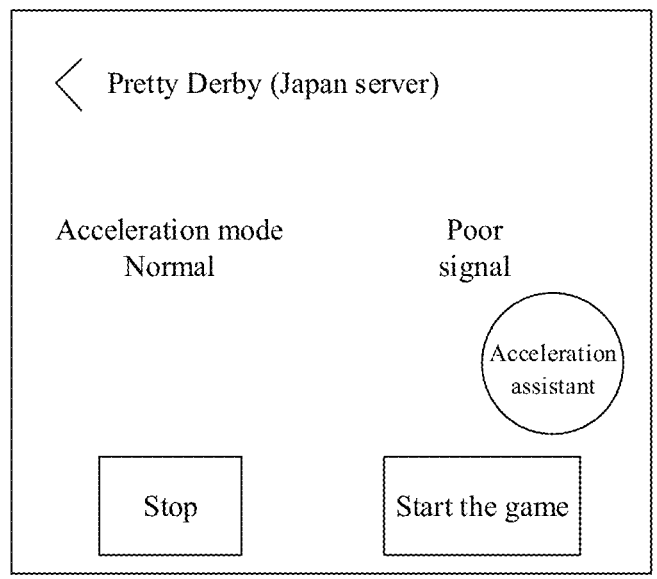
FIG. 4 is a diagram of an application scenario of a floating translation component according to some embodiments.

FIG. 4 is a diagram of an application scenario of the floating translation component according to some embodiments. As shown in FIG. 4, the floating translation component may be in an acceleration assistant for game acceleration of a foreign-server game. The acceleration assistant may monitor an entire running process of the foreign-server game in real time, and perform game acceleration on the foreign-server game. Therefore, the floating translation component may be set in the acceleration assistant to easily resolve a language barrier occurring when the target user enjoys the foreign-server game. This solves a problem that the target user intends to play the foreign-server game but cannot read a foreign language, breaks the language barrier, and enables more users to experience more high-quality and interesting foreign-server games without barriers. In addition, the floating translation component may perform full-screen translation on a display interface in the foreign-server game, which can improve efficiency of translating a character in the display interface and save time for the target user. Moreover, setting the floating translation component in the acceleration assistant of the foreign-server game can avoid interference of the floating translation component when a national-server game is played.

Figure 5:
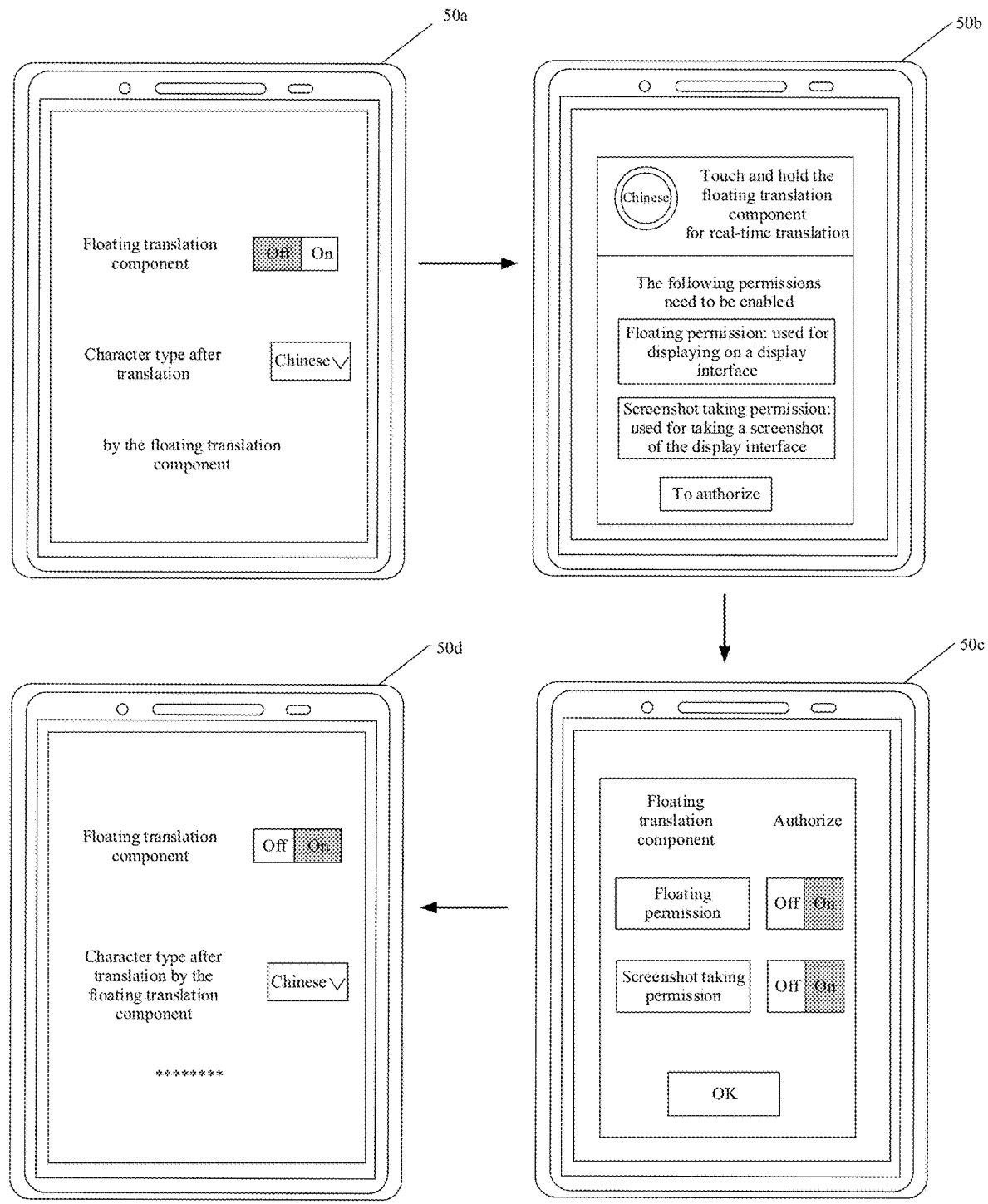
FIG. 5 is a schematic diagram of enabling a configured permission of a floating translation component according to some embodiments.

FIG. 5 is a schematic diagram of enabling the configured permission of the floating translation component according to some embodiments. As shown in FIG. 5, the computer device may set relevant information about the floating translation component in a details page of the floating translation component. As shown in FIG. 5, the target user performs an enabling operation on a component authorization control for the floating translation component in an authorization interface 50a output by the computer device to enable the configured permission of the floating translation component, that is, switch an "Off" state of the component authorization control for the floating translation component to an "On" state. The target user may further set a character type after translation by the floating translation component in the authorization interface 50a, for example, set the character type after translation by the floating translation component to Chinese. Then, the floating translation component may translate any character type in the display interface into the Chinese character type. The target user may further set a default display position, a display size, and other information of the floating translation component in the authorization interface 50a. When the target user performs the enabling operation on the component authorization control for the floating translation component, the computer device may switch the display interface 50a into a display interface 50b in response to the enabling operation performed by the target user on the component authorization control in the authorization interface. The display interface 50b displays a method for using the floating translation component, for example, touching and holding the floating translation component for real-time translation, and information indicating the relevant permission of the floating translation component that needs authorization, for example, the floating permission is used for displaying in the display interface, and a screenshot taking permission is used for taking a screenshot of the display interface. The target user may tap a "To authorize" control in the display interface 50b, and the computer device may switch the display interface 50b to a display interface 50c in response to a tapping operation performed by the target user on the "To authorize" control. As shown in FIG. 5, the display interface 50c includes a floating authorization control and a screenshot taking authorization control for the floating translation component. The target user may set an on/off status corresponding to the floating translation component to the "On" state, and set an on/off status corresponding to the screenshot taking authorization control to the "On" state. The computer device may enable the floating permission of the floating translation component in response to an enabling operation on the floating authorization component, the floating permission being used for indicating that the floating translation component has a permission to be displayed in the first display interface. The computer device enables the screenshot taking permission of the floating translation component in response to a trigger operation on the screenshot taking authorization control, the screenshot taking permission being used for indicating that the floating translation component has a permission to take a screenshot of the first display interface. After the target user enables the floating permission and the screenshot taking permission of the floating translation component, and taps an "OK" button, the computer device may switch the display interface 50c to a display interface 50d in response to a determining operation of the target user, and enable the floating permission and the screenshot taking permission of the floating translation component.

S102: Switch the first display interface to the second display interface in a case that the trigger progress in the floating translation component satisfies the full-screen translation start progress.

In some embodiments, when detecting that the trigger progress in the floating translation component satisfies the full-screen translation start progress, the computer device performs full-screen translation on the character of the first language type in the first display interface to obtain the character of the second language type, generates the second display interface according to the character of the second language type, and switches the first display interface to the second display interface. The second display interface includes the character of the second language type. The character of the second language type is obtained by translating the character of the first language type. The full-screen translation start progress is a start determining condition of the floating translation component. That is, the floating translation component may be started for full-screen translation only when the trigger progress in the floating translation component satisfies the full-screen translation start progress.

In some embodiments, a specific manner in which the computer device switches the first display interface to the second display interface when detecting that the trigger progress in the floating translation component satisfies the full-screen translation start progress may include: displaying a full-screen scanning animation on the first display interface in the case that the trigger progress in the floating translation component satisfies the full-screen translation start progress, the full-screen scanning animation being used for indicating a state in which full-screen interface translation is currently being performed on the first display interface; and switching the first display interface to the second display interface in a case that the full-screen scanning animation ends.

In some embodiments, the computer device displays the full-screen scanning animation on the first display interface when detecting that the trigger progress in the floating translation component satisfies the full-screen translation start progress, the full-screen scanning animation being used for indicating the state in which full-screen interface translation is currently being performed on the first display interface. It takes specific time for the computer device to perform full-screen translation on the character of the first language type in the first display interface to generate the second display interface including the character of the second language type. Therefore, displaying the full-screen scanning animation in the first display interface to prompt the target user of the state in which full-screen interface translation is currently being performed on the first display interface can avoid the target user doubting about whether the floating translation component has been started for full-screen translation and performing a plurality of trigger operations on the floating translation component, and improve experience of the target user in using the floating translation component.

In some embodiments, the second display interface includes a second interface image. A specific manner in which the computer device switches the first display interface to the second display interface when detecting that the trigger progress in the floating translation component satisfies the full-screen translation start progress may include: performing screenshot taking processing on the first display interface to obtain a first interface image in the case that the trigger progress in the floating translation component satisfies the full-screen translation start progress; translating the character of the first language type in the first interface image to obtain the second interface image, the second interface image including the character of the second language type; and displaying the second interface image overlaying the first display interface.

In some embodiments, when detecting that the trigger progress in the floating translation component satisfies the full-screen translation start progress, the computer device performs screenshot taking processing on the currently displayed first display interface to obtain the first interface image corresponding to the first display interface. Alternatively, the computer device may perform screen recording on the first display interface to obtain an interface video, and selects a frame of image from the interface video as the first interface image corresponding to the first display interface. After obtaining the first interface image corresponding to the first display interface, the computer device may perform character extraction on the character of the first language type in the first interface image to obtain the character of the first language type. The computer device may invoke a language translation application program to translate the character of the first language type to obtain the character of the second language type. The second interface image including the character of the second language type is generated according to the character of the second language type. The second interface image is displayed overlaying the first display interface.

In some embodiments, before the computer device performs screenshot taking processing on the first display interface to obtain the first interface image corresponding to the first display interface, the computer device may further display the authorization interface for the floating translation component. The configured permission of the floating translation component is enabled in response to the enabling operation on the component authorization control in the authorization interface. The floating translation component is displayed in the first display interface based on the configured permission in a case that the authorization interface is exited.

In some embodiments, the computer device displays the authorization interface for the floating translation component. The authorization interface includes a permission that needs to be used when the floating translation component performs the translation service. The floating translation component may perform the related service when the permission is enabled by the target user. The target user may enable the configured permission of the floating translation component in response to the enabling operation on the component authorization control in the authorization interface. The computer device may enable the configured permission of the floating translation component in response to the enabling operation on the component authorization control in the authorization interface. The floating translation component is displayed in the first display interface based on the configured permission in the case that the authorization interface is exited.

In some embodiments, the computer device may further obtain the configured permission corresponding to the floating translation component, and detect the screenshot taking permission of the floating translation component according to the configured permission to obtain a screenshot taking permission detection result. The operation of performing screenshot taking processing on the first display interface is executed in a case that the screenshot taking permission detection result indicates that the floating translation component has the screenshot taking permission.

In some embodiments, before performing screenshot taking processing on the first display interface to obtain the first interface image corresponding to the first display interface, the computer device may further obtain the configured permission of the floating translation component. The configured permission includes permission information about whether the floating translation component has the screenshot taking permission. How to obtain the configured permission may refer to the descriptions in operation S101, and will not be elaborated herein. The computer device may detect the screenshot taking permission of the floating translation component according to the configured permission to obtain the screenshot taking permission detection result. The operation of performing screenshot taking processing on the first display interface to obtain the first interface image corresponding to the first display interface is performed in the case that the screenshot taking permission detection result of the floating translation component indicates that the floating translation component has the screenshot taking permission.

In some embodiments, if the computer device detects that the screenshot taking permission detection result of the floating translation component indicates that the floating translation component does not have the screenshot taking permission, a screenshot taking permission editing window is output. The screenshot taking permission editing window includes a second screenshot taking authorization control for enabling the screenshot taking permission of the floating translation component. The target user may tap the second screenshot taking authorization control, and set a status of the second screenshot taking authorization control to the "On" state. The computer device may enable the screenshot taking permission of the floating translation component in response to a trigger operation on the second screenshot taking authorization control in the screenshot taking permission editing window. If the target user does not perform the trigger operation on the second screenshot taking authorization control in the screenshot taking permission editing window, prompt information is output, so as to prompt the target user that the floating translation component may provide the full-screen translation service for the display interface only when the screenshot taking permission of the floating translation component is enabled.

In some embodiments, the component authorization control includes a second floating authorization control and a first screenshot taking authorization control. The configured permission includes the floating permission and the screenshot taking permission. A specific manner in which the computer device enables the configured permission of the floating translation component in response to the enabling operation on the component authorization control in the authorization interface may include: enabling the floating permission of the floating translation component in response to a trigger operation on the second floating authorization control in the authorization interface, the floating permission being used for indicating that the floating translation component has the permission to be displayed in the first display interface; and enabling the screenshot taking permission of the floating translation component in response to a trigger operation on the first screenshot taking authorization control in the authorization interface, the screenshot taking permission being used for indicating that the floating translation component has the permission to take the screenshot of the first display interface.

In some embodiments, the authorization interface includes the second floating authorization control and the first screenshot taking authorization control. The target user may perform the trigger operation on the second floating authorization control and the first screenshot taking authorization control to enable the floating permission and the screenshot taking permission of the floating translation component. The floating permission of the floating translation component is used for indicating that the floating translation component has the permission to be displayed in the first display interface. The screenshot taking permission of the floating translation component is used for indicating that the floating translation component has the permission to take the screenshot of the first display interface. For example, the target user may tap switch buttons respectively corresponding to the second floating authorization control and the first screenshot taking authorization control, and set both the switch buttons respectively corresponding to the second floating authorization control and the first screenshot taking authorization control to the "On" state. The computer device enables the floating permission of the floating translation component in response to the trigger operation performed by the target user on the second floating authorization control in the authorization interface, The computer device may further enable the screenshot taking permission of the floating translation component in response to the trigger operation on the first screenshot taking authorization control.

Figure 6:
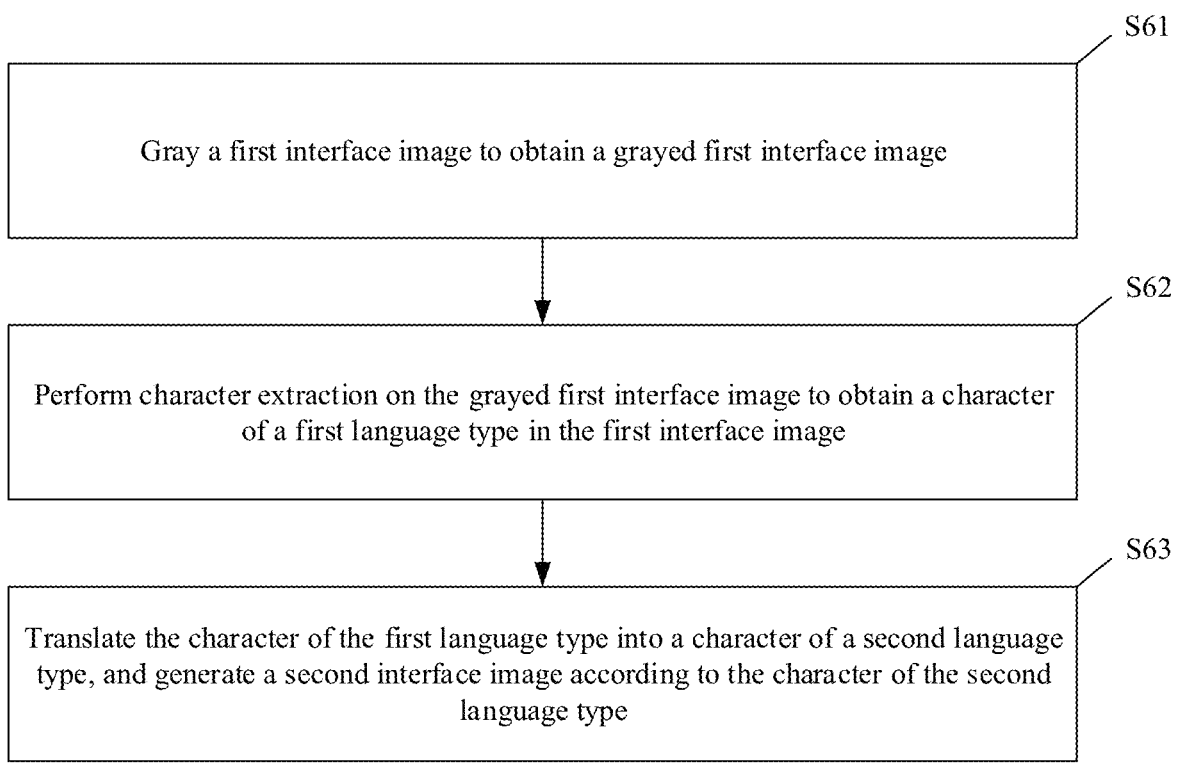
FIG. 6 is a schematic diagram of a method for obtaining a second interface image according to some embodiments.

FIG. 6 is a schematic diagram of a method for obtaining the second interface image according to some embodiments. As shown in FIG. 6, a specific manner in which the computer device translates the character of the first language type in the first interface image to obtain the second interface image including the character of the second language type may include operation S61 to operation S63.

S61: Gray the first interface image to obtain a grayed first interface image.

In some embodiments, after the computer device performs screenshot taking processing on the first display interface to obtain the first interface image when detecting that the trigger progress in the floating translation component satisfies the full-screen translation start progress, the first interface image may be grayed to obtain the grayed first interface image. Graying is a process of converting a color image into a gray image. Since the computer device directly performs screenshot taking processing on the first display interface to obtain the first interface image, the first interface image may be a color image. A color of each pixel in the color image is determined by three color components, and each color component has 255 values, so that a pixel may change within a range of more than 16 million (255*255*255) colors. The gray image may be a special color image whose three color components are the same, and a pixel changes within a range of 255 colors. Therefore, graying the first interface image can reduce a calculation amount for subsequent processing, and improve translation efficiency of full-screen translation of the display interface.

S62: Perform character extraction on the grayed first interface image to obtain the character of the first language type in the first interface image.

In some embodiments, the computer device performs character extraction on the grayed first interface image to obtain the character of the first language type in the first interface image. The computer device performs character extraction on the grayed first interface image, and screens extracted candidate characters to remove a non-verbal character in the candidate characters, for example, an arrow, a circle, a box, or another non-verbal character, to obtain the character of the first language type in the first interface image.

S63: Translate the character of the first language type into the character of the second language type, and generate the second interface image according to the character of the second language type.

In some embodiments, after obtaining the character of the first language type, the computer device may invoke the translation application program to translate the character of the first language type in the first interface image to obtain the character of the second language type, and generate the second interface image according to the character of the second language type.

In some embodiments, when translating the character of the first language type, the computer device may invoke the translation application to perform default translation on the character of the first language type to translate the character of the first language type into a default character (that is, the character of the second language type). For example, the computer device may perform default translation on an English character to obtain a Chinese character.

In some embodiments, the computer device may further obtain a default display character type for the target user, that is, a character type displayed by default on a user terminal of the target user, and translate the character of the first language type into a character of the default display character type.

In some embodiments, a specific manner in which the computer device translates the character of the first language type into the character of the second language type and generates the second interface image according to the character of the second language type may include: performing semantic recognition on the character of the first language type to obtain character semantic information of the character of the first language type; translating the character of the first language type into the character of the second language type according to the character semantic information; obtaining character position information of the character of the first language type in the first interface image, and adding the character of the second language type to a transition interface image according to the character position information; and generating the second interface image including the character of the second language type according to the transition interface image, both the transition interface image and the second interface image having a same size as the first display interface.

In some embodiments, the computer device may perform semantic recognition on the character of the first language type to obtain the character semantic information of the character of the first language type, and translates the character of the first language type into the character of the second language type according to the character semantic information. Alternatively, the computer device may directly invoke the translation application program to translate the character of the first language type to obtain the character of the second language type. The computer device may further establish a two-dimensional coordinate system by using a left-bottom corner of the first interface image as a coordinate origin, and obtain coordinate position information of the character of the first language type in the first interface image in the two-dimensional coordinate system, thereby obtaining the character position information of the character of the first language type in the first interface image. The computer device may add the character of the second language type to the transition interface according to the character position information, and generate the second interface image including the character of the second language type according to the transition interface image. Both the transition interface image and the second interface image have the same size as the first display interface. The transition interface image is a transparent display interface image of the same size as the first display interface.

In some embodiments, a specific manner in which the computer device generates the second interface image including the character of the second language type according to the transition interface image may include: determining, in the transition interface image, a region indicated by the character position information, and determining the region as an addition region; and adding the character of the second language type to the addition region in the transition interface image, and generating the second interface image according to a transition interface image added with the character of the second language type.

In some embodiments, after obtaining the character position information of the character of the first language type in the first interface image, the computer device may determine, in the transition interface image, the region indicated by the character position information as the addition region. The character of the second language type is added to the addition region in the transition interface image. That is, a position of the character of the first language type in the first interface image is the same as that of the character of the second language type in the transition interface image. For example, the left-bottom corner of the first interface image may be determined as the coordinate origin to establish the two-dimensional coordinate system, to obtain the character position information of the character of the first language type. A two-dimensional coordinate system is established by using a left-bottom corner of the transition interface image as a coordinate origin, a region indicated by the character position information is determined as an addition region in the transition interface image, and the character of the second language type is added to the addition region. The computer device may generate the second interface image according to the transition interface image added with the character of the second language type. For example, a background color may be added to the transition interface image added with the character of the second language type to make the transition interface image a display interface image that has a same size as the first display interface and has the background color, thereby generating the second interface image. Alternatively, optimization processing such as denoising processing is performed on the transition interface image added with the character of the second language type to generate the second interface image.

In some embodiments, a specific manner in which the computer device generates the second interface image according to the transition interface image added with the character of the second language type may include: performing pixel recognition on the first interface image to obtain a region color of a region in which the character of the first language type is located in the first interface image; and setting a background color of the transition interface image added with the character of the second language type to the region color to obtain the second interface image.

In some embodiments, the computer device may perform pixel recognition on the first interface image to obtain the region color of the region in which the character of the first language type is located in the first interface image, and set the background color of the transition interface image added with the character of the second language type to the region color to obtain the second interface image. After the computer device obtains the second interface image, since the second interface image is pixel byte data, if the second interface image needs to be displayed, the pixel byte data of the second interface image needs to be encapsulated, that is, the second interface image is converted into a bitmap object, and the second interface image converted into the bitmap object is output in a display screen.

In some embodiments, the floating translation component may be in the game acceleration assistant. When needing to use a full-screen interface translation function provided by the floating translation component, the target user needs to turn on an enabling button of the floating translation component in the game acceleration assistant to enable the floating translation component. The computer device may enable the floating translation component in response to an enabling operation performed by the target user on the floating translation component. The target user may set the floating translation component to be displayed in only a display interface of the foreign-server game and not displayed in an interface of a national-server game. In this way, interference of the floating translation component can be avoided when the target user plays the national-server game. When the target user starts the foreign-server game, the computer device may detect whether the floating translation component is enabled. If the floating translation component is not enabled, the prompt information may be output, so as to prompt the target user to enable the floating translation component to enjoy the full-screen translation function of the floating translation component. If the floating translation component is enabled, the computer device may detect whether the floating permission of the floating translation component is enabled. If the floating permission of the floating translation component is not enabled, the floating permission editing window may be output. The floating permission editing window includes the first floating authorization control for enabling the floating permission of the floating translation component, and the prompt information for prompting the target user that the full-screen translation function of the floating translation component is available only when the floating permission of the floating translation component is enabled.

The target user may tap the first floating authorization control in the floating permission editing window to enable the floating permission of the floating translation component. The computer device may enable the floating permission of the floating translation component in response to a trigger operation performed by the target user on the first floating authorization control, and display the floating translation component in the display interface of the foreign-server game. After displaying the floating translation component in the display interface of the foreign-server game, the computer device may detect whether the floating translation component is displayed for the first time. If the floating translation component is displayed for the first time, a tutorial mask layer may be output. The tutorial mask layer displays a method for using the floating translation component, for example, touching and holding the floating translation component until the full-screen scanning animation appears. If the target user does not enable the floating permission of the floating translation component, the prompt information is output, so as to prompt the target user that the full-screen translation function of the floating translation component is available only when the floating permission of the floating translation component is enabled.

After displaying the floating translation component in the display interface of the foreign-server game, the computer device may detect whether the floating translation component has the screenshot taking permission for screenshot taking or screen recording when detecting that the trigger progress in the floating translation component satisfies the full-screen translation start progress. If detecting that the floating translation component has the screenshot taking permission, the computer device takes a screenshot of the display interface of the foreign-server game, translates the screenshot of the display interface of the foreign-server game, and outputs the translated display interface of the foreign-server game. If detecting that the floating translation component has the screenshot taking permission, the computer device displays the screenshot taking permission editing window. The screenshot taking permission editing window includes the second screenshot taking authorization control for enabling the screenshot taking permission of the floating translation component, and the prompt information for indicating that the full-screen translation function of the floating translation component is available only when the screenshot taking permission of the floating translation component is enabled. The target user can tap the second screenshot taking authorization control in the screenshot taking permission editing window, and set the second screenshot taking authorization control to be the "On" state. The computer device may enable the screenshot taking permission of the floating translation component in response to an enabling operation performed by the target user on the screenshot taking permission of the floating translation component, and perform an operation of performing screenshot taking processing on the display interface of the foreign-server game, thereby performing full-screen translation on the display interface of the foreign-server game.

In some embodiments, the computer device may recognize a position of the character of the first language type in the first interface image to obtain character position information of the character of the first language type in the first interface image. The computer device may obtain a region color of a region in which the character of the first language type is located, and set a background color of a transition interface (for example, a transition mask layer) to the region color of the region in which the character of the first language type is located. The transition interface may be a square. A size of the transition interface is a region size of the region in which the character of the first language type is located. Alternatively, a size of the transition interface is a size of a region extending by P pixels from an edge of the region in which the character of the first language type is located, P being a positive integer. For example, P may be valued to 1, 2, 3, . . . . The character of the second language type is added to the transition interface to generate the second interface image.

Figure 7:
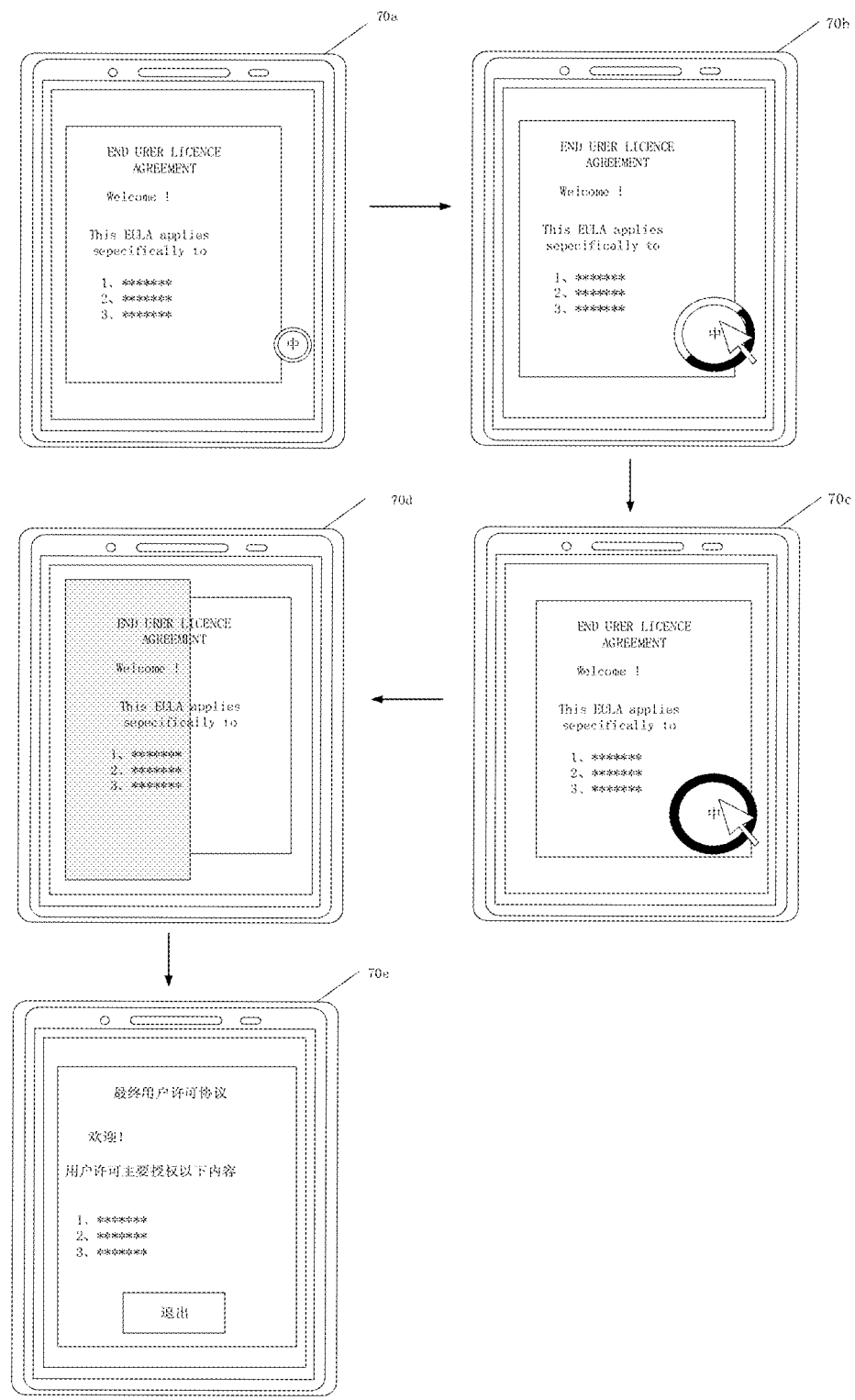
FIG. 7 is a schematic diagram of performing full-screen translation on a display interface by using a floating translation component according to some embodiments.

FIG. 7 is a schematic diagram of performing full-screen translation on a display interface by using the floating translation component according to some embodiments. As shown in FIG. 7, the floating translation component may include performing full-screen translation on a display interface including an English character. The floating translation component may be displayed in a display interface 70a including an English character. The floating translation component may be displayed at a position such as a right-bottom corner, a left-bottom corner, or a left-top corner of the display interface 70a, so as to avoid interference to interface browsing of the target user. When the target user keeps tapping the floating translation component, the computer device may switch the display interface 70a to a display interface 70b. When the target user performs a trigger operation on the floating translation component, that is, taps a display identifier of the floating translation component, the computer device may enlarge the display identifier of the floating translation component, such that the target user notices that the floating translation component is currently being started. The computer device may further display a trigger progress in the floating translation component. The trigger progress is associated with a tapping operation of the target user. For example, it takes 4 seconds for the trigger progress to reach 100%. In this case, when the tapping operation of the target user lasts for 1 second, the computer device may display a trigger progress of 25% in the floating translation component. When detecting that the trigger progress in the floating translation component reaches 100%, the computer device may switch the display interface 70b to a display interface 70c to display that the trigger progress in the floating translation component to reach the full-screen translation start progress of 100%. After detecting that the trigger progress in the floating translation component reaches 100%, the computer device switches the display interface 70c to a display interface 70d, and outputs a full-screen translation scanning animation in the display interface 70d, so as to indicate a state in which full-screen interface translation is currently being performed on the first display interface. When outputting the full-screen translation scanning animation, the computer device may perform screenshot taking processing on the currently displayed display interface (that is, the first display interface) to obtain a first interface image, and translate the English character in the first interface image into a Chinese character corresponding to the English character to generate a second display interface including the Chinese character. After generating the second display interface including the Chinese character, the computer device may stop outputting the full-screen translation scanning animation, and switch the display interface 70d to a display interface 70e to display the Chinese character obtained by translating the English character in the first display interface.

Figure 8:
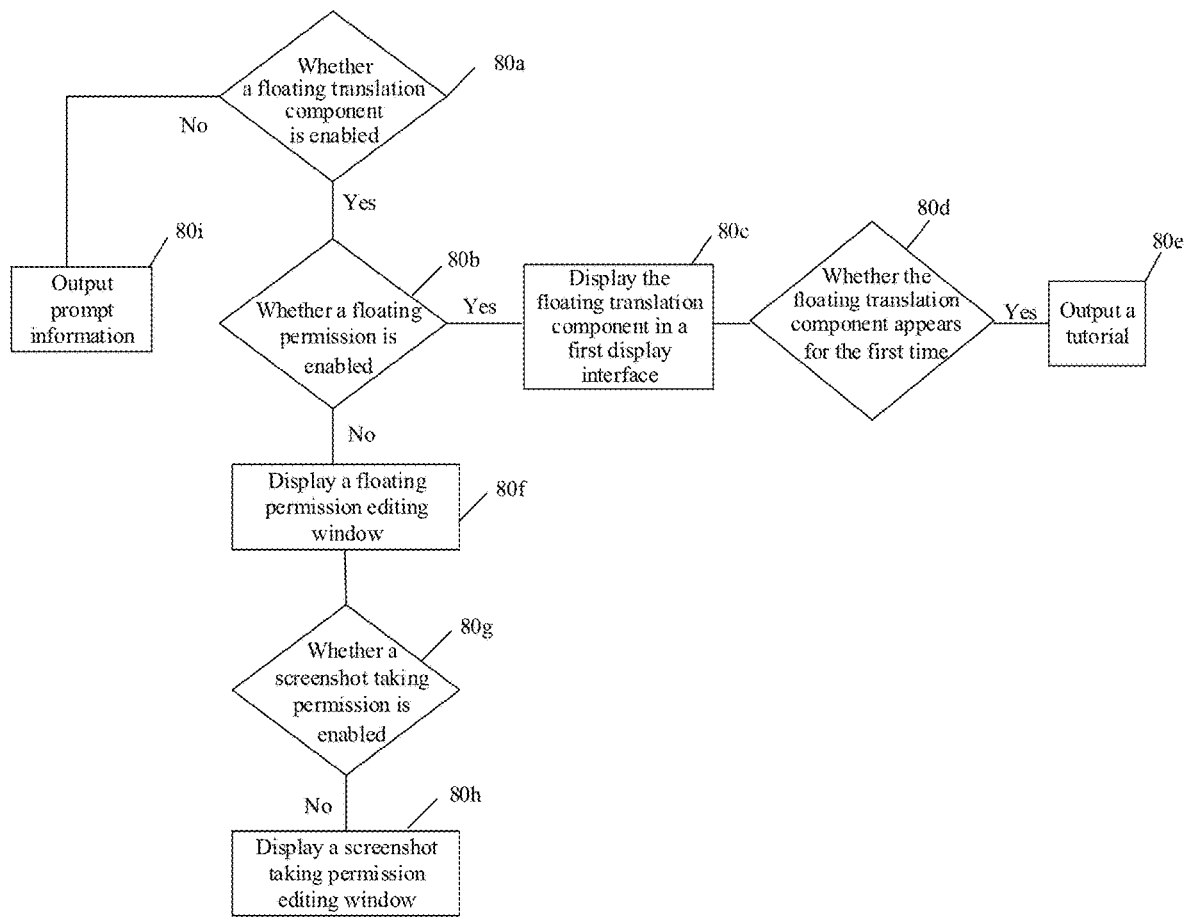
FIG. 8 is a schematic diagram of obtaining a permission configuration of a floating translation component according to some embodiments.

FIG. 8 is a schematic diagram of obtaining a right configuration of the floating translation component according to some embodiments. As shown in FIG. 8, before displaying the floating translation component in the first display interface, the computer device may detect whether the floating translation component is enabled 80a. If detecting that the floating translation component is not enabled, the computer device may output the prompt information 80i, so as to prompt the user to enable the floating translation component to improve the full-screen translation function. If detecting that the floating translation component is enabled, the computer device detects whether the floating permission of the floating translation component is currently enabled 80b. If detecting that the floating permission of the floating translation component has been enabled, the computer device displays the floating translation component in the first display interface 80c. When displaying the floating translation component in the first display interface, the computer device may determine whether the floating translation component appears for the first time 80d. If the floating translation component appears for the first time, a tutorial is output 80e, so as to indicate how to use the floating translation component. If detecting that the floating permission of the floating translation component is not enabled, the computer device displays the floating permission editing window 80f, for the target user to enable the floating permission of the floating translation component. The computer device may detect whether the screenshot taking permission of the floating translation component is currently enabled 80g. If it is detected that the screenshot taking permission of the floating translation component is not enabled, the screenshot taking permission editing window is displayed for the target user to enable the screenshot taking permission of the floating translation component.

In some embodiments, the trigger progress is displayed in the floating translation component in response to the trigger operation on the floating translation component in the first display interface, the first display interface including the character of the first language type, the trigger progress being associated with the trigger duration, and the trigger duration being the duration of the trigger operation on the floating translation component. In this way, displaying the trigger progress in the floating translation component can indicate the state in which the floating translation component is currently being started. When the target user does not need to start the floating translation component, the trigger operation on the floating translation component may be stopped. This can avoid the floating translation component being started by a mistaken touch. The first display interface is switched to the second display interface in the case that the trigger progress in the floating translation component satisfies the full-screen translation start progress, the second display interface including the character of the second language type, and the character of the second language type being obtained by translating the character of the first language type. The first display interface is switched to the second display interface in the case that the trigger progress in the floating translation component satisfies the full-screen translation start progress, the second display interface including the character of the second language type, and the character of the second language type being obtained by translating the character of the first language type. Since full-screen translation may be performed on the character in the first display interface by triggering the floating translation component, efficiency of translating the character in the first display interface can be improved.

Figure 9:
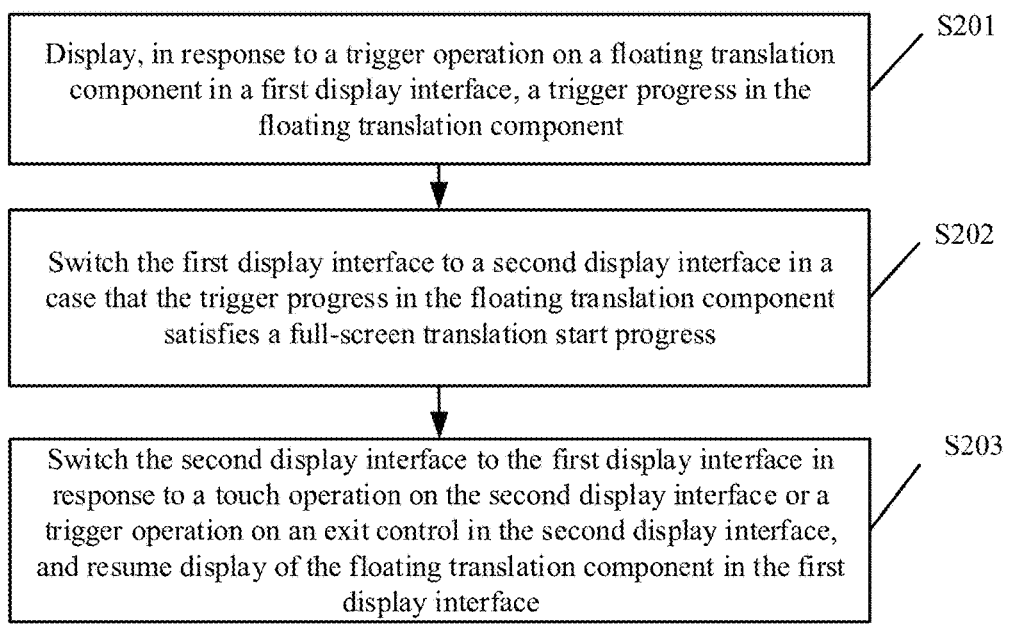
FIG. 9 is a schematic flowchart of an interface information processing method according to some embodiments.

FIG. 9 is a schematic flowchart of an interface information processing method according to some embodiments. The interface information processing method may be performed by a computer device. The computer device may be a server (for example, the server 10 in FIG. 1), or a user terminal (for example, any user terminal in the user terminal cluster in FIG. 1), or a system including a server and a user terminal. This is not limited in this application. As shown in FIG. 9, the interface information processing method may include operations S201 to S203.

S201: Display, in response to a trigger operation on a floating translation component in a first display interface, a trigger progress in the floating translation component.

S202: Switch the first display interface to a second display interface in a case that the trigger progress in the floating translation component satisfies a full-screen translation start progress.

Specific content of operations S201 to S202 in some embodiments may refer to the content of operations S101 to S102 in FIG. 3, and will not be elaborated herein.

S203: Switch the second display interface to the first display interface in response to a touch operation on the second display interface or a trigger operation on an exit control in the second display interface, and resume display of the floating translation component in the first display interface.

In some embodiments, when intending to exit the second display interface, a target user may tap the exit button in the second display interface, or touch any position in the second display interface, to exit the second display interface. The computer device may switch the second display interface to the first display interface in response to the touch operation performed by the target user on the second display interface or the trigger operation on the exit control in the second display interface, and resume display of the floating translation component in the first display interface.

In some embodiments, the computer device may further obtain, in response to a dragging operation on the floating translation component, movement position information determined by the dragging operation, and update a display position of the floating translation component in the first display interface according to the movement position information. Current display position information of the floating translation component is obtained in response to detecting that the dragging operation ends, and distances between the display position information and N interface boundaries of the first display interface are obtained respectively, N being a positive integer greater than or equal to 3. An interface boundary corresponding to a minimum distance is obtained as a target interface boundary, and the floating translation component is displayed on the target interface boundary.

In some embodiments, the target user may drag the floating translation component in the first display interface to any position in the first display interface, so as to adjust the display position of the floating translation component to avoid display of the floating translation component affecting browsing of the first display interface by the target user. The computer device may respond to the dragging operation performed by the target user on the floating translation component, obtain the movement position information determined by the dragging operation, and update the display position information of the floating translation component in the first display interface according to the movement position information. When detecting that the dragging operation performed by the target user on the floating translation component ends, the computer device obtains the current display position information of the floating translation component, and obtains the distances between the display position information and the N interface boundaries of the first display interface respectively. The interface boundary corresponding to the minimum distance is obtained as the target interface boundary, and the floating translation component is displayed on the target interface boundary.

For example, after dragging the floating translation component to a target position (a real-time display position at which the target user releases the floating translation component, that is, a current display position) in the first display interface, the target user stops the dragging operation on the floating translation component, for example, releases the floating translation component. The computer device may detect whether the target position of the floating translation component belongs to a boundary position of the first display interface (that is, a boundary region of the first display interface). If the target position of the floating translation component does not belong to the boundary position of the first display interface, distances between the target position and interface boundaries of the first display interface are obtained respectively. For example, the first display interface includes a first interface boundary, a second interface boundary, a third interface boundary, and a fourth interface boundary. In this case, a first distance between the current target position of the floating translation component and the first interface boundary may be obtained. The computer device may obtain a second distance between the current target position of the floating translation component and the second interface boundary, a third distance between the current display position information of the floating translation component and the third interface boundary, and a fourth distance between the current target position of the floating translation component and the fourth interface boundary. The computer device may obtain a boundary interface corresponding to a minimum distance in the first distance, the second distance, the third distance, and the fourth distance as a target interface boundary, and display the floating translation component on the target interface boundary.

Figure 10:
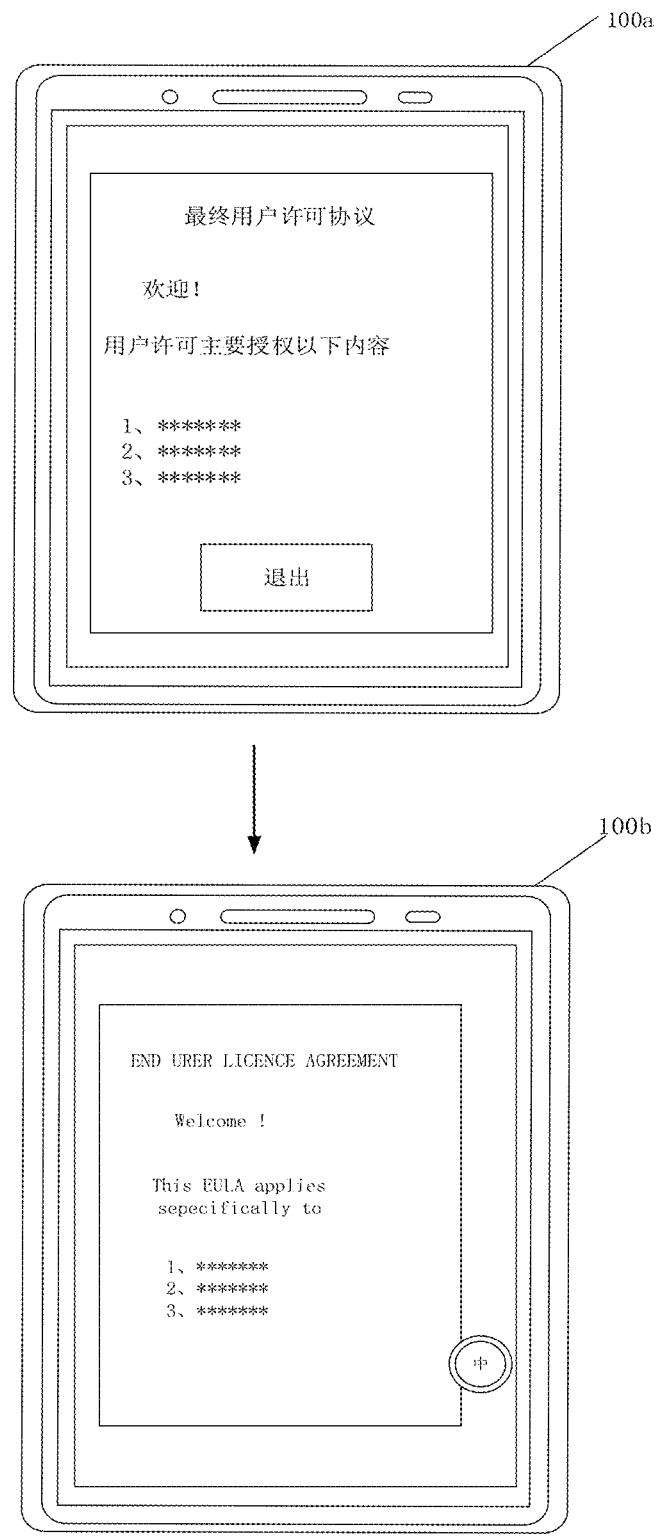
FIG. 10 is a schematic diagram of resuming display of a floating translation component according to some embodiments.

FIG. 10 is a schematic diagram of resuming display of the floating translation component according to some embodiments. As shown in FIG. 10, the target user may tap an "Exit" button in the second display interface to exit the second display interface, and resume display of the floating translation component. When detecting that the trigger progress in the floating translation component satisfies the full-screen translation start progress, the computer device switches the first display interface to the second display interface, and the target user may understand and read the character of the second language type in the second display interface. When finishing reading and intending to exit the second display interface, the target user may tap the "Exit" button in the second display interface. The computer device may switch the second display interface 100a to the first display interface 100b in response to a trigger operation performed by the target user on the "Exit" button in the second display interface, and resume display of the floating translation component.

Figure 11:
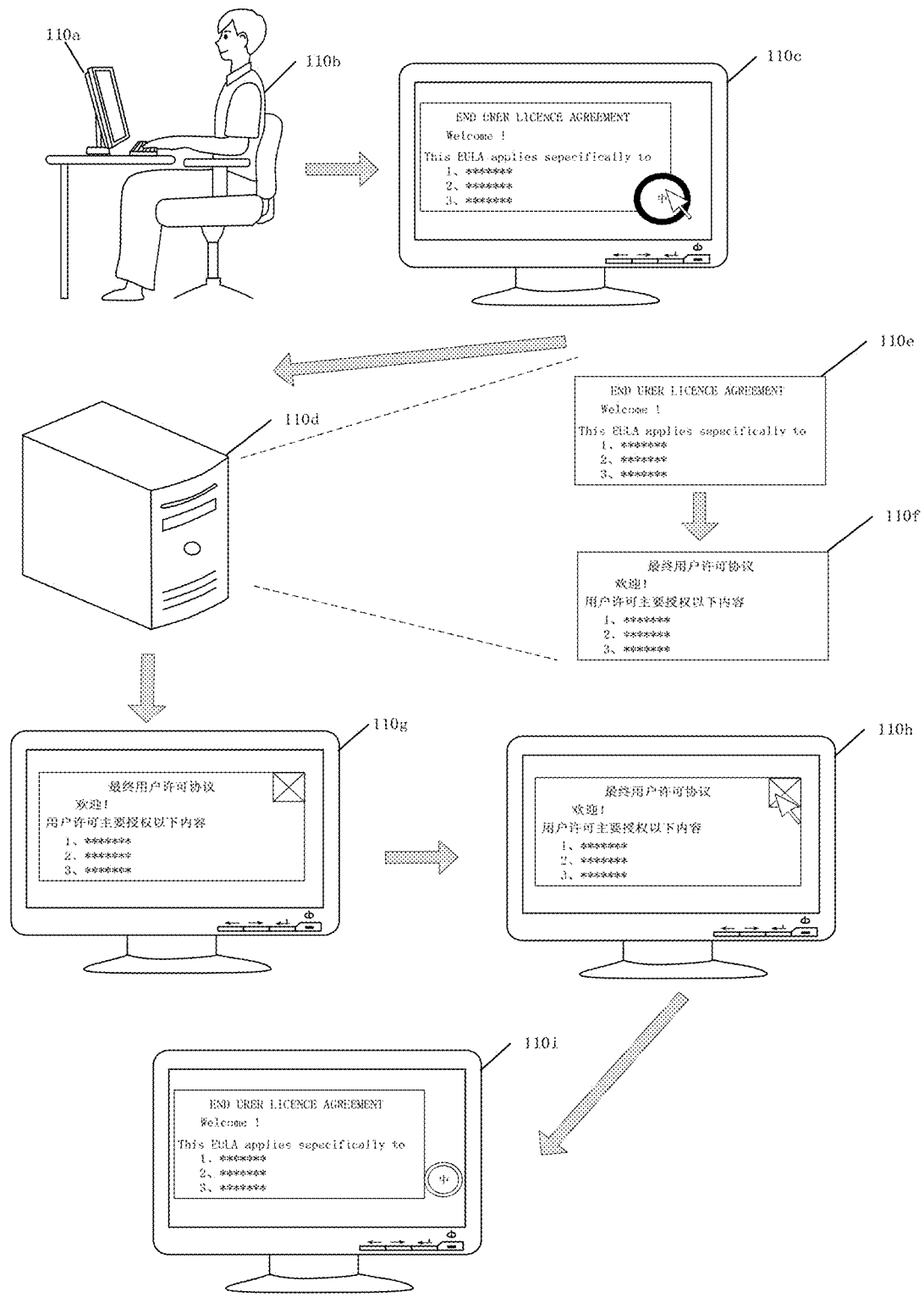
FIG. 11 is a schematic diagram of performing full-screen translation on a display interface according to some embodiments.

FIG. 11 is a schematic diagram of performing full-screen translation on a display interface according to some embodiments. As shown in FIG. 11, if encountering a display interface with a language barrier when browsing a display interface in a screen of a user terminal 110a, a target user 110b may start the floating translation component to perform full-screen translation on the display interface with the language barrier, so as to browse the display interface without any language barrier. If the target user 110b browses a display interface including a character of a first language type (that is, an English character), the user terminal displays the floating translation component in the display interface including the English character if detecting that the floating translation component has a floating permission. If detecting that the target user 110b taps the floating translation component in the display interface, the user terminal 110a may display a trigger progress in the floating translation component in response to a tapping operation of the target user 110b. The trigger progress is associated with a continuous tapping operation performed by the target user on the floating translation component. When the computer device detects that the trigger progress in the floating translation component is the full-screen translation start progress of 100%, that is, when a display interface 110c is displayed, the user terminal 110a may determine the currently displayed display interface as a first display interface, and detects whether the floating translation component has a screenshot taking permission. If the floating translation component has the screenshot taking permission, a screenshot of the first display interface is taken to obtain a first interface image corresponding to the first display interface.

After obtaining the first interface image 110e, the user terminal may send the first interface image 110e to a server 110d, and send a display interface translation request to the server 110d. The display interface translation request includes a target language type (that is, Chinese). The target language type is used for determining to translate the character of the first language type (that is, the English character) in the first display interface into a character of the target language type (that is, a Chinese character). If not receiving the target language type specified by the user terminal 110a, the server 110d may directly perform default translation on the character of the first language type in the first display interface to obtain a character of a second language type. After receiving the first interface image 110e and the display interface translation request that are sent by the user terminal 110a, the server 110d may gray the first interface image 110e to obtain a grayed first interface image, thereby reducing a data processing amount for translating the first interface image 110e. The server 110d may perform character extraction on the grayed first interface image to obtain the English character in the first interface image 110e, perform semantic recognition on the English character to obtain a semantic recognition result, and obtain the Chinese character corresponding to the English character in the first interface image 110e according to the semantic recognition result. The server 110d may obtain character position information of the English character in the grayed first interface image, and determine a position of first position information in a transition interface as second character position information. The server 110d may add the Chinese character corresponding to the English character in the first interface image 110e to a region in which the second character position information is located to generate a second interface image 110f.

After generating the second interface image 110f, the server 110d may send the second interface image 110f to the user terminal 110a. After receiving the second interface image 110f, the user terminal 110a may display the second interface image 110f overlaying the first display interface, that is, display a display interface 110g. The display interface 110g includes an exit button for exiting the display interface 110g. After completing browsing information in the display interface 110g, the target user 110b may tap the exit button in the display interface 110g to exit the display interface 110g. When the target user 110b taps the exit button in the display interface 110g, that is, when a display interface 110h is displayed in the user terminal, the user terminal 110a may switch the display interface 110h to a display interface 110i to exit the display interface including the Chinese character in response to a tapping operation of the target user 110b, and resume display of the display interface including the English character and display of the floating translation component.

In some embodiments, the trigger progress is displayed in the floating translation component in response to the trigger operation on the floating translation component in the first display interface, the first display interface including the character of the first language type, the trigger progress being associated with trigger duration, and the trigger duration being duration of the trigger operation on the floating translation component. In this way, displaying the trigger progress in the floating translation component can indicate a state in which the floating translation component is currently being started. When the target user does not need to start the floating translation component, the trigger operation on the floating translation component may be stopped. This can avoid the floating translation component being started by a mistaken touch. The first display interface is switched to the second display interface in the case that the trigger progress in the floating translation component satisfies the full-screen translation start progress, the second display interface including the character of the second language type, and the character of the second language type being obtained by translating the character of the first language type. When the trigger progress in the floating translation component satisfies the full-screen translation start progress, the floating translation component is started to perform full-screen translation on the character of the first language type in the first display interface. In this way, the floating translation component is started only when it is determined that the target user intends to start the floating translation component. This avoids unnecessary interference of the floating translation component to the user, and can improve user experience and avoid a hardware resource waste caused by mistaken tapping of the floating translation component by the target user. In addition, after the floating translation component is started, a full-screen scanning animation may be displayed in the first display interface to prompt the target user of the state in which full-screen interface translation is currently being performed on the first display interface, full-screen translation is performed on the character of the first language type in the first display interface to generate the second display interface including the character of the second language type, and the first display interface is switched to the second display interface. This can improve efficiency of translating the character in the display interface. Moreover, the second display interface may be switched to the first display interface in response to the touch operation performed by the target user on the second display interface or the trigger operation on the exit control in the second display interface, and display of the floating translation component is resumed in the first display interface. In this way, the target user may continue to browse a subsequent display interface and use a full-screen translation function of the floating translation component again. In some embodiments, since full-screen translation may be directly performed on the character in the first display interface by triggering the floating translation component, the efficiency of translating the character in the display interface can be greatly improved.

Figure 12:
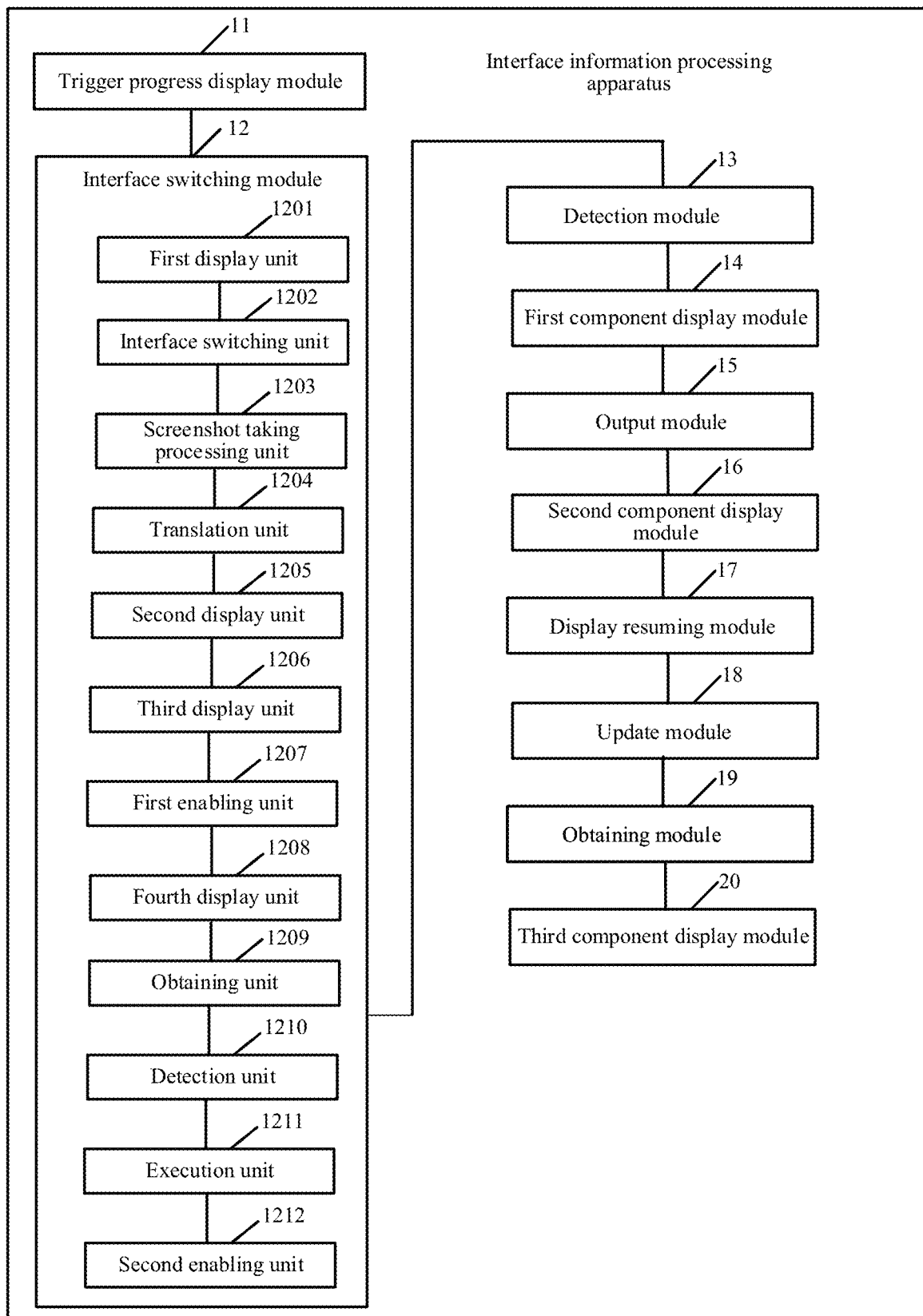
FIG. 12 is a schematic structural diagram of an interface information processing apparatus according to some embodiments.

FIG. 12 is a schematic structural diagram of an interface information processing apparatus according to some embodiments. The interface information processing apparatus may be a computer program (including program code) running in a computer device. For example, the interface information processing apparatus is application software. The interface information processing apparatus may be configured to perform the corresponding operations in the interface information processing method provided in some embodiments. As shown in FIG. 12, the interface information processing apparatus may include a trigger progress display module 11, an interface switching module 12, a detection module 13, a first component display module 14, an output module 15, a second component display module 16, a display resuming module 17, an update module 18, an obtaining module 19, and a third component display module 20.

The trigger progress display module 11 is configured to display, in response to a trigger operation on a floating translation component in a first display interface, a trigger progress in the floating translation component. The first display interface includes a character of a first language type. The trigger progress is associated with trigger duration. The trigger duration is duration of the trigger operation on the floating translation component.

The interface switching module 12 is configured to switch the first display interface to a second display interface in a case that the trigger progress in the floating translation component satisfies a full-screen translation start progress. The second display interface includes a character of a second language type. The character of the second language type is obtained by translating the character of the first language type.

The interface information processing apparatus further includes:

the detection module 13, configured to obtain a configured permission corresponding to the floating translation component, and detect a floating permission of the floating translation component according to the configured permission to obtain a floating permission detection result; and the first component display module 14, configured to display the floating translation component in the first display interface in a case that the floating permission detection result indicates that the floating translation component has the floating permission.

The interface information processing apparatus further includes:

the output module 15, configured to output a floating permission editing window for the floating translation component in a case that the floating permission detection result indicates that the floating translation component does not have the floating permission; and the second component display module 16, configured to display the floating translation component in the first display interface in response to an enabling operation on the first floating authorization control in the floating permission editing window.

The interface switching module 12 includes:

a first display unit 1201, configured to display a full-screen scanning animation on the first display interface in the case that the trigger progress in the floating translation component satisfies the full-screen translation start progress, the full-screen scanning animation being used for indicating a state in which full-screen interface translation is currently being performed on the first display interface; and an interface switching unit 1202, configured to switch the first display interface to the second display interface in a case that the full-screen scanning animation ends.

The interface information processing apparatus further includes:

the display resuming module 17, configured to switch the second display interface to the first display interface in response to a touch operation on the second display interface or a trigger operation on an exit control in the second display interface, and resume display of the floating translation component in the first display interface.

The interface information processing apparatus further includes:

the update module 18, configured to obtain, in response to a dragging operation on the floating translation component, movement position information determined by the dragging operation, and update a display position of the floating translation component in the first display interface according to the movement position information;

the obtaining module 19, configured to obtain current display position information of the floating translation component in response to detecting that the dragging operation ends, and obtain distances between the display position information and N interface boundaries of the first display interface respectively, N being a positive integer greater than or equal to 3; and the third component display module 20, configured to obtain an interface boundary corresponding to a minimum distance as a target interface boundary, and display the floating translation component on the target interface boundary.

The second display interface includes a second interface image.

The interface switching module 12 further includes:

a screenshot taking processing unit 1203, configured to perform screenshot taking processing on the first display interface to obtain a first interface image in the case that the trigger progress in the floating translation component satisfies the full-screen translation start progress;

a translation unit 1204, configured to translate the character of the first language type in the first interface image to obtain the second interface image including the character of the second language type; and a second display unit 1205, configured to display the second interface image overlaying the first display interface.

The interface switching module 12 further includes:

a third display unit 1206, configured to display an authorization interface for the floating translation component;

a first enabling unit 1207, configured to enable a configured permission of the floating translation component in response to an enabling operation on a component authorization control in the authorization interface; and a fourth display unit 1208, configured to display the floating translation component in the first display interface based on the configured permission in a case that the authorization interface is exited.

In some embodiments, the component authorization control includes a second floating authorization control and a first screenshot taking authorization control. The configured permission includes a floating permission and a screenshot taking permission.

The first enabling unit 1207 is configured to:

enable the floating permission of the floating translation component in response to a trigger operation on the second floating authorization control in the authorization interface, the floating permission being used for indicating that the floating translation component has a permission to be displayed in the first display interface; and enable the screenshot taking permission of the floating translation component in response to a trigger operation on the first screenshot taking authorization control in the authorization interface, the screenshot taking permission being used for indicating that the floating translation component has a permission to take a screenshot of the first display interface.

The interface switching module 12 further includes:

an obtaining unit 1209, configured to obtain a configured permission corresponding to the floating translation component;

a detection unit 1210, configured to detect a screenshot taking permission of the floating translation component according to the configured permission to obtain a screenshot taking permission detection result; and an execution unit 1211, configured to execute, in a case that the screenshot taking permission detection result indicates that the floating translation component has the screenshot taking permission, the operation of performing screenshot taking processing on the first display interface.

The interface switching module 12 further includes:

a second enabling unit 1212, configured to output a screenshot taking permission editing window in a case that the screenshot taking permission detection result indicates that the floating translation component does not have the screenshot taking permission, and enable the screenshot taking permission of the floating translation component in response to a trigger operation on a second screenshot taking authorization control in the screenshot taking permission editing window.

The translation unit 1204 is configured to:

gray the first interface image to obtain a grayed first interface image;

perform character extraction on the grayed first interface image to obtain the character of the first language type in the first interface image; and translate the character of the first language type into the character of the second language type, and generate the second interface image according to the character of the second language type.

The translation unit 1204 is further configured to:

perform semantic recognition on the character of the first language type to obtain character semantic information of the character of the first language type, and translate the character of the first language type into the character of the second language type according to the character semantic information; and obtain character position information of the character of the first language type in the first interface image, add the character of the second language type to a transition interface image according to the character position information, and generate the second interface image including the character of the second language type according to the transition interface image, both the transition interface image and the second interface image having a same size as the first display interface.

The translation unit 1204 is further configured to:

determine, in the transition interface image, a region indicated by the character position information as an addition region;

add the character of the second language type to the addition region in the transition interface image; and generate the second interface image according to a transition interface image added with the character of the second language type.

The translation unit 1204 is further configured to:

perform pixel recognition on the first interface image to obtain a region color of a region in which the character of the first language type is located in the first interface image; and set a background color of the transition interface image added with the character of the second language type to the region color to obtain the second interface image.

Specific implementations of the trigger progress display module 11, the interface switching module 12, the detection module 13, the first component display module 14, the output module 15, the second component display module 16, the display resuming module 17, the update module 18, the obtaining module 19, and the third component display module 20 may refer to the descriptions in the embodiment corresponding to FIG. 3 or FIG. 9, and will not be elaborated herein.

According to some embodiments, each module in the interface information processing apparatus shown in FIG. 12 may exist respectively or be combined into one or more units. Alternatively, a certain (or some) unit in the units may be further split into multiple smaller function subunits, thereby implementing the same operations without affecting the technical effects of some embodiments. The modules are divided based on logical functions. In actual applications, a function of one module may be realized by multiple units, or functions of multiple modules may be realized by one unit. In another embodiment of this application, the interface information processing apparatus may further include other units. In actual applications, these functions may also be realized cooperatively by the other units, and may be realized cooperatively by multiple units.

A person skilled in the art would understand that these "modules" and "units" could be implemented by hardware logic, a processor or processors executing computer software code, or a combination of both. The "modules" and "units" may also be implemented in software stored in a memory of a computer or a non-transitory computer-readable medium, where the instructions of each module and unit are executable by a processor to thereby cause the processor to perform the respective operations of the corresponding module and unit.

In some embodiments, the trigger progress is displayed in the floating translation component in response to the trigger operation on the floating translation component in the first display interface, the first display interface including the character of the first language type, the trigger progress being associated with the trigger duration, and the trigger duration being the duration of the trigger operation on the floating translation component. In this way, displaying the trigger progress in the floating translation component can indicate the state in which the floating translation component is currently being started. When a target user does not need to start the floating translation component, the trigger operation on the floating translation component may be stopped. This can avoid the floating translation component being started by a mistaken touch. The first display interface is switched to the second display interface in the case that the trigger progress in the floating translation component satisfies the full-screen translation start progress, the second display interface including the character of the second language type, and the character of the second language type being obtained by translating the character of the first language type. When the trigger progress in the floating translation component satisfies the full-screen translation start progress, the floating translation component is started to perform full-screen translation on the character of the first language type in the first display interface. In this way, the floating translation component is started only when it is determined that the target user intends to start the floating translation component. This avoids unnecessary interference of the floating translation component to the user, and can improve user experience. In addition, after the floating translation component is started, the full-screen scanning animation may be displayed in the first display interface to prompt the target user of the state in which full-screen interface translation is currently being performed on the first display interface, full-screen translation is performed on the character of the first language type in the first display interface to generate the second display interface including the character of the second language type, and the first display interface is switched to the second display interface. This can improve efficiency of translating the character in the display interface. Moreover, the second display interface may be switched to the first display interface in response to the touch operation performed by the target user on the second display interface or the trigger operation on the exit control in the second display interface, and display of the floating translation component is resumed in the first display interface. In this way, the target user may continue to browse a subsequent display interface and use a full-screen translation function of the floating translation component again. In some embodiments, since full-screen translation may be directly performed on the character in the first display interface by triggering the floating translation component, the efficiency of translating the character in the display interface can be improved.

Figure 13:
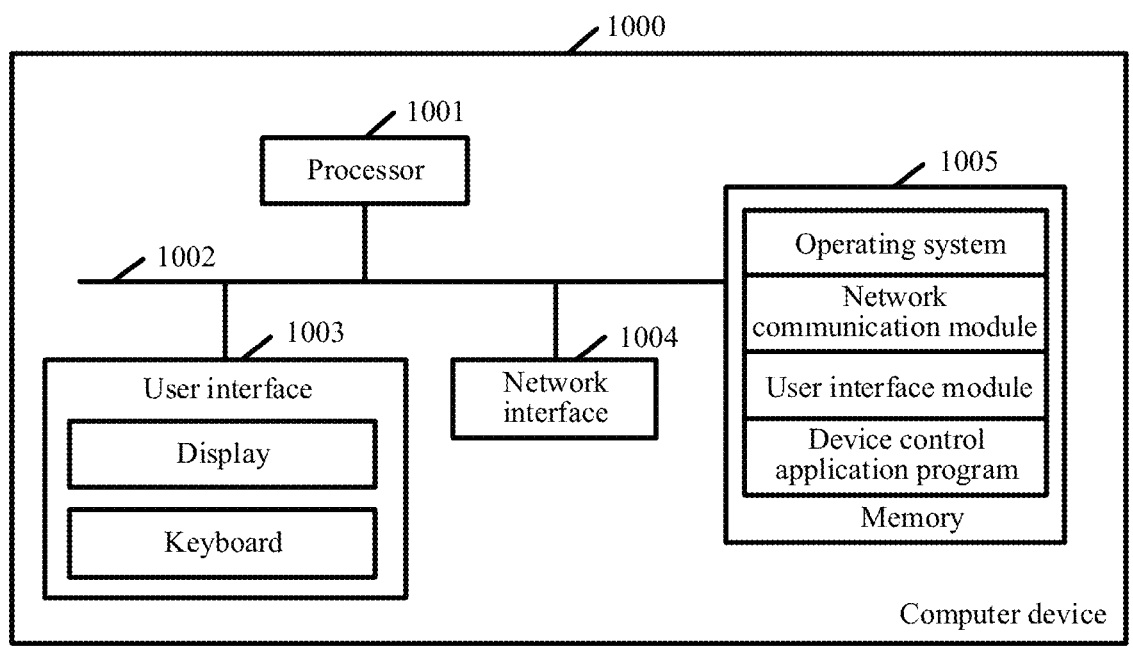
FIG. 13 is a schematic structural diagram of a computer device according to some embodiments.

FIG. 13 is a schematic structural diagram of a computer device according to some embodiments. As shown in FIG. 13, the computer device 1000 may include a processor 1001, a network interface 1004, and a memory 1005. In addition, the computer device 1000 may further include a target user interface 1003 and at least one communication bus 1002. The communication bus 1002 is configured to implement connection communication between these components. The target user interface 1003 may include a display and a keyboard. In some embodiments, the target user interface 1003 may further include a standard wired interface and wireless interface. The network interface 1004 may include a standard wired interface and a standard wireless interface (such as a wireless fidelity (Wi-Fi) interface). The memory 1005 may be a high-speed random access memory (RAM), or may be a non-volatile memory, for example, at least one disk memory. Alternatively, the memory 1005 may be at least one storage apparatus far away from the processor 1001. As shown in FIG. 13, as a computer-readable storage medium, the memory 1005 may include an operating system, a network communication module, a target user interface module, and a device control application program.

In the computer device 1000 shown in FIG. 13, the network interface 1004 may provide a network communication function. The target user interface 1003 is mainly configured to provide an input interface for a target user. The processor 1001 may be configured to invoke the device control application program stored in the memory 1005 to implement:

displaying, in response to a trigger operation on a floating translation component in a first display interface, a trigger progress in the floating translation component, the first display interface including a character of a first language type, the trigger progress being associated with trigger duration, and the trigger duration being duration of the trigger operation on the floating translation component; and switching the first display interface to a second display interface in a case that the trigger progress in the floating translation component satisfies a full-screen translation start progress, the second display interface including a character of a second language type, and the character of the second language type being obtained by translating the character of the first language type.

It is to be understood that the computer device 2000 described in some embodiments may execute the descriptions about the interface information processing method in the embodiment corresponding to FIG. 3, or may execute the descriptions about the interface information processing apparatus in the embodiment corresponding to FIG. 12. Elaborations are omitted herein.

In some embodiments, the trigger progress is displayed in the floating translation component in response to the trigger operation on the floating translation component in the first display interface, the first display interface including the character of the first language type, the trigger progress being associated with the trigger duration, and the trigger duration being the duration of the trigger operation on the floating translation component. In this way, displaying the trigger progress in the floating translation component can indicate a state in which the floating translation component is currently being started. When the target user does not need to start the floating translation component, the trigger operation on the floating translation component may be stopped. This can avoid the floating translation component being started by a mistaken touch. The first display interface is switched to the second display interface in the case that the trigger progress in the floating translation component satisfies the full-screen translation start progress, the second display interface including the character of the second language type, and the character of the second language type being obtained by translating the character of the first language type. When the trigger progress in the floating translation component satisfies the full-screen translation start progress, the floating translation component is started to perform full-screen translation on the character of the first language type in the first display interface. In this way, the floating translation component is started only when it is determined that the target user intends to start the floating translation component. This avoids unnecessary interference of the floating translation component to the user, and can improve user experience and avoid a hardware resource waste caused by mistaken tapping of the floating translation component by the target user. In addition, after the floating translation component is started, a full-screen scanning animation may be displayed in the first display interface to prompt the target user of the state in which full-screen interface translation is currently being performed on the first display interface, full-screen translation is performed on the character of the first language type in the first display interface to generate the second display interface including the character of the second language type, and the first display interface is switched to the second display interface. This can improve efficiency of translating the character in the display interface. Moreover, the second display interface may be switched to the first display interface in response to a touch operation performed by the target user on the second display interface or a trigger operation on an exit control in the second display interface, and display of the floating translation component is resumed in the first display interface. In this way, the target user may continue to browse a subsequent display interface and use a full-screen translation function of the floating translation component again. In some embodiments, since full-screen translation may be directly performed on the character in the first display interface by triggering the floating translation component, the efficiency of translating the character in the display interface can be greatly improved.

In addition, some embodiments also provide a computer-readable storage medium. The computer-readable storage medium stores a computer program executed by the interface information processing apparatus mentioned above. The computer program includes program instructions. The processor, when executing the program instructions, may execute the descriptions about the interface information processing method in the embodiment corresponding to FIG. 3. Therefore, elaborations are omitted herein. In addition, the description of beneficial effects of the same method are not described herein again. Technical details that are not disclosed in the embodiment of the computer-readable storage medium involved in this application refer to the descriptions in the method embodiments of this application. As an example, the program instruction may be deployed in a computing device for execution, or executed in multiple computing devices at the same place, or executed in multiple computing devices interconnected through a communication network at multiple places. The multiple computing device interconnected through the communication network at multiple places may form a blockchain system.

In addition, some embodiments also provides a computer program product or computer program. The computer program product or computer program may include computer instructions. The computer instructions may be stored in a computer-readable storage medium. A processor of a computer device reads the computer instructions from the computer-readable storage medium. The processor may execute the computer instructions to enable the computer device to execute the descriptions about the interface information processing method in the embodiment corresponding to FIG. 3 or FIG. 9. Elaborations are omitted herein. In addition, the description of beneficial effects of the same method are not described herein again. Technical details that are not disclosed in the embodiment of the computer program product or computer program involved in this application refer to the descriptions in the method embodiments of this application.

It is to be noted that for brevity of description, each method embodiment is expressed into a combination of a series of actions. However, it is to be known by a person skilled in the art that this application is not limited to an action sequence described herein because some operations may be performed in another sequence or at the same time according to this application. Second, it is also to be known by a person skilled in the art that all of the embodiments described in this specification are some embodiments of this application, and involved actions and modules are not always necessary to this application.

The operations in the method in some embodiments can be sequentially adjusted, combined, and deleted according to actual needs.

The modules in the apparatus in some embodiments can be combined, divided, and deleted according to actual needs.

It can be understood by a person of ordinary skill in the art that all or some of the processes in the method in the foregoing embodiments may be completed by a computer program by instructing related hardware. The computer program may be stored in a computer-readable storage medium. When the program is executed, the processes in each method embodiment may be included. The storage medium may be a magnetic disk, an optical disk, a read-only memory (ROM), a RAM, or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. An interface information processing method, performed by a computer device, comprising:
displaying, based on a trigger operation on a floating translation component in a first display interface, a trigger progress in the floating translation component, the first display interface comprising a character of a first language type, the trigger progress being associated with a trigger duration, and the trigger duration being a duration of the trigger operation on the floating translation component;

switching the first display interface to a second display interface based on the trigger progress in the floating translation component satisfying a full-screen translation start progress, the second display interface comprising a character of a second language type, and the character of the second language type being obtained by translating the character of the first language type;

displaying an authorization interface for the floating translation component;

enabling a configured permission of the floating translation component based on an enabling operation on a component authorization control in the authorization interface; and displaying the floating translation component in the first display interface based on the configured permission based on the authorization interface being exited.

2. The interface information processing method according to claim 1, wherein the second display interface comprises a second interface image, and the switching comprises:

performing a screenshot taking processing operation on the first display interface to obtain a first interface image based on the trigger progress in the floating translation component satisfying the full-screen translation start progress;

translating the character of the first language type in the first interface image to obtain the second interface image, the second interface image comprising the character of the second language type; and displaying the second interface image overlaying the first display interface.

3. The interface information processing method according to claim 2, wherein the translating the character of the first language type in the first interface image comprises:

graying the first interface image to obtain a grayed first interface image;

performing character extraction on the grayed first interface image to obtain the character of the first language type in the first interface image; and translating the character of the first language type into the character of the second language type, and generating the second interface image according to the character of the second language type.

4. The interface information processing method according to claim 3, wherein the translating the character of the first language type into the character of the second language type and generating the second interface image according to the character of the second language type comprises:

performing semantic recognition on the character of the first language type to obtain character semantic information of the character of the first language type, and translating the character of the first language type into the character of the second language type according to the character semantic information; and obtaining character position information of the character of the first language type in the first interface image, adding the character of the second language type to a transition interface image according to the character position information, and generating the second interface image comprising the character of the second language type according to the transition interface image, both the transition interface image and the second interface image having a same size as the first display interface.

5. The interface information processing method according to claim 4, wherein the adding comprises:

determining, in the transition interface image, a region indicated by the character position information as an addition region;

adding the character of the second language type to the addition region in the transition interface image; and generating the second interface image according to the transition interface image added with the character of the second language type.

6. The interface information processing method according to claim 5, wherein the generating the second interface image according to the transition interface image added with the character of the second language type comprises:

performing pixel recognition on the first interface image to obtain a region color of a region in which the character of the first language type is located in the first interface image; and setting a background color of the transition interface image added with the character of the second language type to the region color to obtain the second interface image.

7. The interface information processing method according to claim 2, wherein the method further comprises:

detecting a screenshot taking permission of the floating translation component according to the configured permission to obtain a screenshot taking permission detection result; and executing, based on the screenshot taking permission detection result indicating that the floating translation component has the screenshot taking permission, the screenshot taking processing operation on the first display interface.

8. The interface information processing method according to claim 2, wherein a component authorization control further comprises a first floating authorization control, and the method further comprises:

detecting a floating permission of the floating translation component according to the configured permission to obtain a floating permission detection result; and displaying the floating translation component in the first display interface based on the floating permission detection result indicating that the floating translation component has the floating permission; or outputting a floating permission editing window for the floating translation component based on the floating permission detection result indicating that the floating translation component does not have the floating permission, and displaying the floating translation component in the first display interface based on an enabling operation on the first floating authorization control in the floating permission editing window.

9. The interface information processing method according to claim 1, wherein the component authorization control comprises a second floating authorization control and a first screenshot taking authorization control and the configured permission comprises a floating permission and a screenshot taking permission, and the enabling the configured permission of the floating translation component comprises:

enabling the floating permission of the floating translation component based on a trigger operation on the second floating authorization control in the authorization interface, the floating permission indicating that the floating translation component has a permission to be displayed in the first display interface; and enabling the screenshot taking permission of the floating translation component based on a trigger operation on the first screenshot taking authorization control in the authorization interface, the screenshot taking permission indicating that the floating translation component has a permission to take a screenshot of the first display interface.

10. The interface information processing method according to claim 1, wherein the switching comprises:
displaying a full-screen scanning animation on the first display interface based on the trigger progress in the floating translation component satisfying the full-screen translation start progress, the full-screen scanning animation being used for indicating a state in which full-screen interface translation is currently being performed on the first display interface; and
switching the first display interface to the second display interface based on the full-screen scanning animation ending.

11. The interface information processing method according to claim 1, wherein the method further comprises:
obtaining, based on a dragging operation on the floating translation component, movement position information determined by the dragging operation, and updating a display position of the floating translation component in the first display interface according to the movement position information;
obtaining current display position information of the floating translation component based on detecting that the dragging operation ends, and obtaining distances between the display position information and N interface boundaries of the first display interface respectively, N being a positive integer greater than or equal to 3; and
obtaining an interface boundary corresponding to a minimum distance as a target interface boundary, and displaying the floating translation component on the target interface boundary.

12. The interface information processing method according to claim 1, wherein the method further comprises:
switching the second display interface to the first display interface based on a touch operation on the second display interface or a trigger operation on an exit control in the second display interface, and resuming display of the floating translation component in the first display interface.

13. An interface information processing apparatus comprising:
at least one memory configured to store program code; and
at least one processor configured to read the program code and operate as instructed by the program code, the program code comprises:
trigger progress display code configured to cause the at least one processor to display, based on a trigger operation on a floating translation component in a first display interface, a trigger progress in the floating translation component, the first display interface comprising a character of a first language type, the trigger progress being associated with trigger duration, and the trigger duration being a duration of the trigger operation on the floating translation component;
interface switching code configured to cause the at least one processor to switch the first display interface to a second display interface based on the trigger progress in the floating translation component satisfying a full-screen translation start progress, the second display interface comprising a character of a second language type, and the character of the second language type being obtained by translating the character of the first language type;
first display code configured to cause the at least one processor to display an authorization interface for the floating translation component;
first enabling code configured to cause the at least one processor to enable a configured permission of the floating translation component based on an enabling operation on a component authorization control in the authorization interface; and
second display code configured to cause the at least one processor to display the floating translation component in the first display interface based on the configured permission based on the authorization interface being exited.

14. The interface information processing apparatus according to claim 13, wherein the second display interface comprises a second interface image, and the interface switching code is further configured to cause the at least one processor to:
perform a screenshot taking processing operation on the first display interface to obtain a first interface image based om the trigger progress in the floating translation component satisfying the full-screen translation start progress;
translate the character of the first language type in the first interface image to obtain the second interface image, the second interface image comprising the character of the second language type; and
display the second interface image overlaying the first display interface.

15. The interface information processing apparatus according to claim 13, wherein the interface switching code is further configured to cause the at least one processor to:
display a full-screen scanning animation on the first display interface based on the trigger progress in the floating translation component satisfying the full-screen translation start progress, the full-screen scanning animation being used for indicating a state in which full-screen interface translation is currently being performed on the first display interface; and
switch the first display interface to the second display interface based on the full-screen scanning animation ending.

16. The interface information processing apparatus according to claim 13, wherein the program code further comprises:
update code configured to cause the at least one processor to obtain, based on a dragging operation on the floating translation component, movement position information determined by the dragging operation, and update a display position of the floating translation component in the first display interface according to the movement position information;
obtaining code configured to cause the at least one processor to obtain current display position information of the floating translation component based on detecting that the dragging operation ends, and obtain distances between the display position information and N interface boundaries of the first display interface respectively, N being a positive integer greater than or equal to 3; and
third component display code configured to cause the at least one processor to obtain an interface boundary corresponding to a minimum distance as a target interface boundary, and display the floating translation component on the target interface boundary.

17. The interface information processing apparatus according to claim 13, wherein the program code further comprises:
   display resuming code configured to cause the at least one processor to switch the second display interface to the first display interface based on a touch operation on the second display interface or a trigger operation on an exit control in the second display interface, and resume display of the floating translation component in the first display interface.

18. A non-transitory computer-readable storage medium storing computer code that when executed by at least one processor causes the at least one processor to:
   display, based on a trigger operation on a floating translation component in a first display interface, a trigger progress in the floating translation component, the first display interface comprising a character of a first language type, the trigger progress being associated with a trigger duration, and the trigger duration being a duration of the trigger operation on the floating translation component;
   switch the first display interface to a second display interface based on the trigger progress in the floating translation component satisfying a full-screen translation start progress, the second display interface comprising a character of a second language type, and the character of the second language type being obtained by translating the character of the first language type;
   display an authorization interface for the floating translation component;
   enable a configured permission of the floating translation component based on an enabling operation on a component authorization control in the authorization interface; and
   display the floating translation component in the first display interface based on the configured permission based on the authorization interface being exited.

19. The non-transitory computer-readable storage medium according to claim 18, wherein the second display interface comprises a second interface image, and
   the computer code when executed by at least one processor causes the at least one processor to switch the first display interface to the second display interface by:
   performing a screenshot taking processing operation on the first display interface to obtain a first interface image based on the trigger progress in the floating translation component satisfying the full-screen translation start progress;
   translating the character of the first language type in the first interface image to obtain the second interface image, the second interface image comprising the character of the second language type; and
   displaying the second interface image overlaying the first display interface.

* * * * *